United States Patent
Wachi

(10) Patent No.: US 6,819,375 B2
(45) Date of Patent: Nov. 16, 2004

(54) COLOR FILTER HAVING SURFACE PROFILE FOR LIQUID CRYSTAL ALIGNMENT, LIQUID CRYSTAL DISPLAY PANEL, AND METHOD OF PRODUCING

(75) Inventor: Reiko Wachi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/345,110

(22) Filed: Jan. 15, 2003

(65) Prior Publication Data

US 2003/0147027 A1 Aug. 7, 2003

(30) Foreign Application Priority Data

Jan. 15, 2002 (JP) ........................................ 2002-006541
Nov. 27, 2002 (JP) ........................................ 2002-343962

(51) Int. Cl.[7] ........................ G02F 1/1337; G02F 1/1335
(52) U.S. Cl. ........................ 349/106; 349/129; 349/191
(58) Field of Search ..................... 349/106, 129, 349/191

(56) References Cited

U.S. PATENT DOCUMENTS 5,818,560 A * 10/1998 Kouno et al. ................ 349/129
5,831,704 A * 11/1998 Yamada et al. .............. 349/124
6,573,959 B1 * 6/2003 Molsen ........................ 349/113
6,654,090 B1 * 11/2003 Kim et al. ................... 349/129

FOREIGN PATENT DOCUMENTS

| JP | 5-45653 | 2/1993 |
|---|---|---|
| JP | 5-61049 | 3/1993 |
| JP | 6-34975 | 2/1994 |
| JP | 6-214234 | 8/1994 |
| JP | 7-199193 | 8/1995 |
| JP | 8-262445 | 10/1996 |
| JP | 2001-154198 | 6/2001 |
| JP | 2001-154199 | 6/2001 |

* cited by examiner

*Primary Examiner*—Tarifur R. Chowdhury
*Assistant Examiner*—Andrew Schechter
(74) *Attorney, Agent, or Firm*—Harness, Dickey & Pierce, P.L.C.

(57) ABSTRACT

A color filter is provided on the surface of a substrate that opposes liquid crystals. The color filter has a surface profile defining the state of alignment of the liquid crystals. More specifically, the color filter has a plurality of alignment control protrusions whose top portions extend in one direction. A thin alignment film is formed so as to cover the color filter having such a surface profile.

15 Claims, 16 Drawing Sheets

COLOR FILTER HAVING SURFACE PROFILE FOR LIQUID CRYSTAL ALIGNMENT, LIQUID CRYSTAL DISPLAY PANEL, AND METHOD OF PRODUCING

BACKGROUND OF THE INVENTION

1. Technical Field of the Invention

The present invention relates to a color filter substrate and a method of producing the same, a liquid crystal display panel using the color filter substrate, and an electronic apparatus.

2. Description of the Related Art

A liquid crystal display panel comprises a pair of substrates bonded together with a sealant, and liquid crystals sealed between both of the substrates. In order to define an alignment state of the liquid crystals when a voltage is not applied thereto, in general, the liquid crystal display panel is formed so that alignment films that are formed on the surfaces of the respective substrates opposing the liquid crystals using polyimide or the like are rubbed. The rubbing is an operation that is carried out on the surfaces of the alignment films in a certain direction with a rubbing cloth (buff cloth) wound upon a roller.

However, dust that is produced when the surfaces of the alignment films are rubbed with a rubbing cloth adheres to a display area, so that a reduction in the display quality, such as an uneven display, results. In addition, the surface states of the rubbed alignment films are determined by various conditions associated with rubbing, such as the strength or force with which the tip of the rubbing cloth contacts the surfaces of the alignment films, the material of the rubbing cloth, or how fast the alignment films are rubbed with the rubbing cloth. However, these conditions have many uncertainties, so that many of them are difficult to control qualitatively. For this reason, it becomes difficult to form alignment films of desired qualities, and therefore the yield of liquid crystal display panels is reduced. Further, when a liquid crystal display panel comprising a switching element such as a TFD (thin film diode) element or a TFT (thin film transistor) element is used, these switching elements may break due to static electricity that is produced when the alignment films are rubbed with a rubbing cloth. Accordingly, since various problems arise due to rubbing, there is a need for a technology for defining the state of alignment of liquid crystals without rubbing alignment films.

The present invention has been achieved in view of the above-described circumstances, and has as one object the provision of a color filter substrate which makes it possible to restrict the occurrence of problems caused by rubbing an alignment film, a method of producing the color filter substrate, a liquid crystal display panel using the color filter substrate, and an electronic apparatus.

SUMMARY OF THE INVENTION

To overcome the above-described problems, according to the present invention, there is provided a color filter substrate comprising one of a pair of substrates for sandwiching liquid crystals and color filters, the color filters are disposed on the surface of the one substrate that faces the liquid crystals, the color filters transmit light of a particular wavelength and have surface profiles defining a state of alignment of the liquid crystals.

With such a color filter substrate, since the surface profile of each color filter defines the state of alignment of the liquid crystals, it is not necessary to rub an alignment film for defining the state of alignment of the liquid crystals. Therefore, the occurrence of the various problems caused by rubbing an alignment film, such as the adherence of dust that is produced as the alignment film is rubbed or electrostatic damage to a switching element, is eliminated, so that a high yield of color filter substrates can be maintained.

The surface of each color filter may have a profile defined by a plurality of alignment control protrusions whose top portions extend in one direction. By using this structure, it is possible to align (in parallel) liquid crystal molecules to which a voltage is not applied so that the long axes thereof are disposed along the aforementioned one direction. Alternatively, the surface of each color filter may have a profile defined by an alignment control protrusion having a plurality of surfaces that are inclined with respect to the surface of the one substrate and protruding towards a side away from the one substrate at an intersection line of each surface. By using this structure, it is possible to align (vertically) liquid crystal molecules to which a voltage is not applied so that the long axes thereof face a direction perpendicular to the inclined surfaces. The surface of each color filter may have a curved profile protruding towards a side away from the one substrate to similarly achieve vertical alignment.

According to another aspect of the present invention, there is provided a liquid crystal display panel comprising liquid crystals between a pair of opposing substrates, and color filters which are disposed on the surface of one of the pair of substrates that faces the liquid crystals. The color filters transmit light of a particular wavelength and have surface profiles defining a state of alignment of the liquid crystals.

In this liquid crystal display panel, since the surface profile of each color filter can define the alignment state of the liquid crystals, as in the color filter substrate described above, the occurrence of the various problems caused by rubbing an alignment film can be eliminated. In the liquid crystal display panel, the surface of each color filter may have a profile defined by a plurality of alignment control protrusions whose top portions extend in one direction; or the surface of each color filter may have a profile defined by an alignment control protrusion having a plurality of surfaces that are inclined with respect to the surface of the one substrate and protrude towards a side away from the one substrate at an intersection line of each surface; or the surface of each color filter may have a curved profile protruding towards a side away from the one substrate. In other words, the surface profile of each color filter may be selected so that the long axes of the molecules of the liquid crystals are substantially parallel, that is, so that they are aligned in parallel (or homogeneously) with respect to the surface of one of the substrates, or so that the long axes of the liquid crystal molecules are inclined, that is, so that they are aligned vertically (or homeotropically) with respect to the surface of one of the substrates. The state of alignment of the liquid crystals is not limited to these, so that the liquid crystal molecules may be aligned in other ways. In other words, the surface profile of each color filter is not limited to the above-described profiles, so that the liquid crystal molecules can be aligned in other desired directions as appropriate.

According to another aspect of the present invention, there is provided an electronic apparatus comprising the above-described liquid crystal display panel. As mentioned above, according to the liquid crystal display panel of the present invention, it is possible to eliminate a reduction in the yield of color filter substrates, so that the cost of producing the electronic apparatus that incorporates the liquid crystal display panel can be reduced. Examples of such an electronic apparatus include a personal computer and a cellular phone.

According to another aspect of the present invention, there is provided a method of producing a color filter substrate including one of a pair of substrates for sandwiching liquid crystals and color filters which transmit light of a particular wavelength. The method comprises a first step of forming a resin layer on the surface of the one substrate that faces the liquid crystals, and a second step of selectively removing portions of the resin layer in order to form the color filters having surface profiles that define a direction of alignment of the liquid crystals.

According to this method, since color filters having surface profiles defining the direction of alignment of the liquid crystals are formed, it is not necessary to rub an alignment film. Therefore, it is possible to eliminate the occurrence of the various problems caused by the rubbing. In addition, since profiles for defining the direction of alignment of the liquid crystals are provided at the same time that the color filters are formed, the production process is simplified and production cost is reduced compared to the case where a member for defining the direction of alignment of the liquid crystals is formed separately from the color filter.

The second step may comprise removing a plurality of linear areas at a surface of the resin layer over a portion of the resin layer in the thickness direction thereof. Alternatively, the second step may comprise removing a portion of the resin layer with successively varying depths in accordance with locations of a surface of the resin layer. The portion of the resin layer that is removed is not limited to the aforementioned portions, so that a portion of the resin layer that is removed may be selected in accordance with the desired alignment state of the liquid crystal molecules as appropriate.

DETAILED DESCRIPTION OF THE PREFERRED EMBODIMENTS

Hereunder, a description of various embodiments of the present invention will be given with reference to the drawings. The embodiments are some forms of the present invention, and do not limit the scope of the invention, so that any modifications may be made within the scope of the present invention. In each of the figures below, in order to illustrate each layer and each member with recognizable sizes, the scales of each layer and each member are different.

A: First Embodiment

First, the form in which the present invention is applied to an active matrix liquid crystal display panel will be described. Hereunder, the case where a TFD (thin film diode) element, which is a two-terminal switching element, is used as a switching element will be used as an example. A liquid crystal display panel that is described below is what is called a transflective liquid crystal display panel which can perform a display operation both by reflecting outside light, such as sunlight or illumination light inside a room, and by transmitting irradiation light from a backlight unit.

A-1: Structure of Liquid Crystal Display Panel

Figure 1:
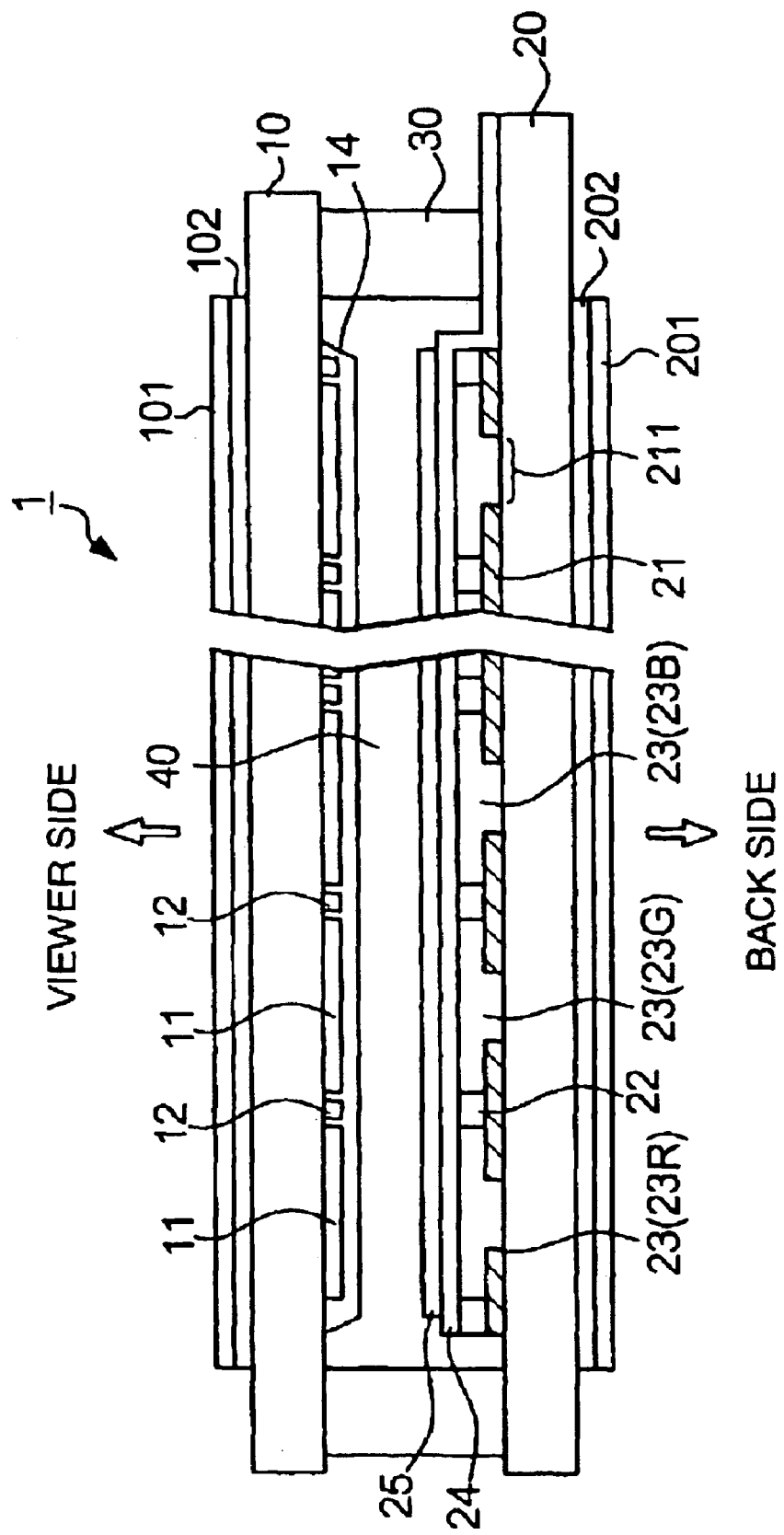
FIG. 1 is a sectional view of the structure of a liquid crystal display panel of a first embodiment of the present invention.

FIG. 1 is a sectional view of the structure of the liquid crystal display panel of the embodiment. As shown in FIG. 1, a liquid crystal display panel 1 comprises a first substrate 10 and a second substrate 20 that oppose each other and that are bonded with a sealant 30, and liquid crystals 40 that are sealed in an area surrounded by both of the substrates and the sealant 30. Hereunder, as shown in FIG. 1, the side of the first substrate 10 opposite the liquid crystals 40 is indicated as "viewer side." In other words, the "viewer side" means the side where a viewer views a display of the liquid crystal display panel 1. On the other hand, the side of the second substrate 20 opposite the liquid crystals 40 is indicated as "back side."

The first substrate 10 and the second substrate 20 are light-transmissive plate-shaped members formed of, for example, glass, quartz, or plastic. Polarizers 101 and 201 for polarizing incident light are bonded to the outer sides (sides opposite to the liquid crystals 40) of the respective first substrate 10 and the second substrate 20. Similarly, retardation films 102 and 202 for compensating for interference color are bonded to the outer sides of the respective first substrate 10 and the second substrate 20. Although, a backlight unit (illuminator) is actually disposed at the back side of the liquid crystal display panel 1, it is not shown in FIG. 1.

Figure 2:
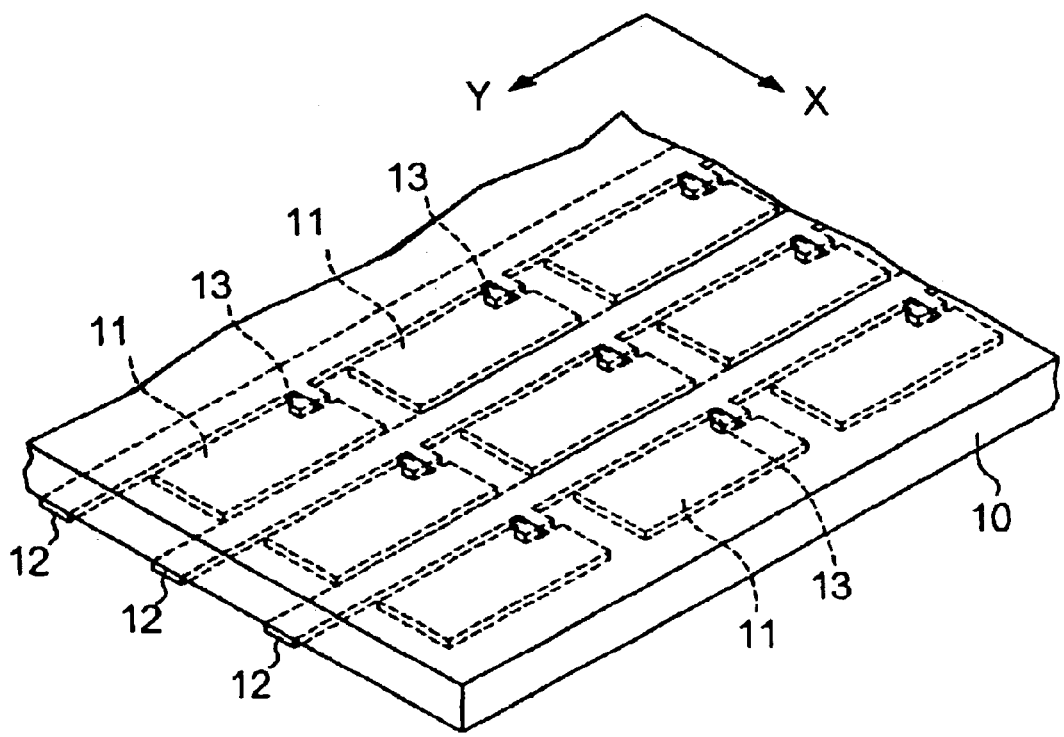
FIG. 2 is a perspective view of the structure of a portion of the liquid crystal display panel.
Figure 2:
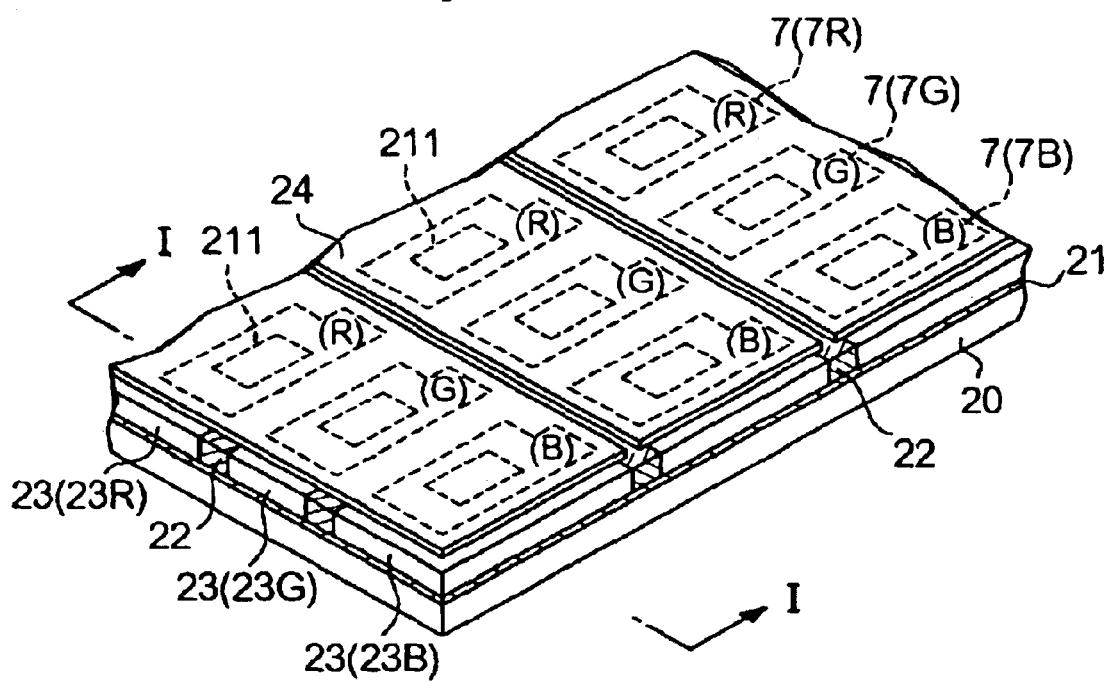

FIG. 2 is a perspective view showing in enlarged form the main portion of the liquid crystal display panel 1. The sectional view taken along line I—I in FIG. 2 corresponds to FIG. 1. For simplification, in FIG. 2, the polarizers 101 and 201, the retardation films 102 and 202, etc., are not shown. As shown in FIGS. 1 and 2, a plurality of pixel electrodes 11, disposed in a matrix, and a plurality of scanning lines 12, extending in one direction (in direction Y in FIG. 2) in the gaps between the pixel electrodes 11, are formed on the inside surface of the first substrate 10. Each pixel electrode 11 is a substantially rectangular electrode formed of, for example, a transparent conductive material such as ITO (indium tin oxide).

As shown in FIG. 2, each pixel electrode 11 and a scanning line 12 adjacent to the pixel electrode 11 are connected together through a TFD element 13. Each TFD element 13 is a two-terminal switching element having a nonlinear current-voltage characteristic. As shown in FIG. 1, the surface of the first substrate 10 having the pixel electrodes 11, the scanning lines 12, and the TFD elements 13 formed thereon is covered with an alignment film 14 (not shown in FIG. 2). The alignment film 14 is a thin organic film, such as a polyimide film, and is rubbed for defining the state of alignment of the liquid crystals 40 when a voltage is not applied thereto.

On the other hand, as shown in FIG. 1, a reflective layer 21, light-shielding layers 22, color filters 23 (23R, 23G, and 23B), data lines 24, and an alignment film 25 are formed on the inside surface (that is, the surface at the side of the liquid crystals 40) of the second substrate 20 in that order as viewed from the side of the second substrate 20. As shown in FIG. 2, the data lines 24 are stripe-shaped electrodes formed of transparent conductive materials such as ITO, and are formed above the surfaces of the color filters 23 and light-shielding layers 22. The data lines 24 extend in a direction in which they intersect the scanning lines 12 (in a direction X shown in FIG. 2), and oppose the pixel electrodes 11 arranged in rows on the first substrate 10. In such a structure, the direction of alignment of the liquid crystals 40 that are sandwiched by the first substrate 10 and the second substrate 20 changes by application of a voltage between the pixel electrodes 11 and the data lines 24 opposing the pixel electrodes 11. In other words, as shown in FIG. 2, the areas where the pixel electrodes 11 and the respective data lines 24 oppose are disposed in a matrix, and function as sub-pixels 7. In other words, the sub-pixels 7 are the smallest unit areas where the direction of alignment of the liquid crystals changes in accordance with the application of voltage.

As shown in FIG. 1, the surfaces of the color filters 23 and light-shielding layers 22 where the data lines 24 are formed are covered with the alignment film 25. The alignment film 25 is the same as the alignment film 14 in that it is a thin organic film formed of polyimide or the like, but differs from it in that it is not rubbed.

The reflective layer 21 is formed of, for example, a single metal, such as aluminum or silver, or an alloy containing any one of these metals as a main component, and is a thin film that has light reflectivity. Light (such as illumination light inside a room or sunlight) incident upon the liquid crystal display panel 1 from the viewer side is reflected at the surface of the reflective layer 21. The light exits from the reflective layer 21 and is viewed by a viewer, so that the liquid crystal display panel 1 performs a displaying operation by reflection. The inside surface of the second substrate 20 is made rough (not shown), so that the surface of the reflective layer 21 has a scattering structure in correspondence with this rough surface.

As shown in FIGS. 1 and 2, light-transmissive sections 211 are provided at the portions of the reflective layer 21 near the central portions of the respective sub-pixels 7. The light-transmissive sections 211 are openings for transmitting light incident upon the liquid crystal display panel 1 from the back surface side thereof towards the viewer side. In other words, illumination light from the backlight unit exits towards the viewer side through the light-transmissive sections 211 of the reflective layer 21. The light is viewed by a viewer, so that the liquid crystal display panel 1 performs a display operation by transmission.

The light-shielding layers 22 are formed in the form of a lattice so as to overlap the gaps between the sub-pixels 7 disposed in a matrix (that is, the areas other than the areas where the pixel electrodes 11 and the respective data lines 24 oppose each other), and have the role of shielding the gaps between the sub-pixels 7 from light. The light-shielding layers 22 are formed of a resin material containing black coloring material, such as carbon black or a pigment, or a metal such as chromium (Cr).

The color filters 23 are resin layers formed in correspondence with the respective sub-pixels 7, and are colored red (R), green (G), or blue (B) with a dye or a pigment. In other words, the color filters 23 of the respective colors selectively transmit light having wavelengths of the respective colors. By the three types of sub-pixels 7R, 7G, and 7B corresponding to the color filters 23 of the respective three colors, red, green, and blue, one pixel (dot), which is the smallest unit of display, is formed. In the embodiment, as shown in FIG. 2, the case using a structure in which color filters 23 of the same color are disposed over a plurality of sub-pixels 7 that form rows in the direction of extension of the scanning lines 12 (that is, what is called a stripe arrangement) is taken as an example.

Figure 3:
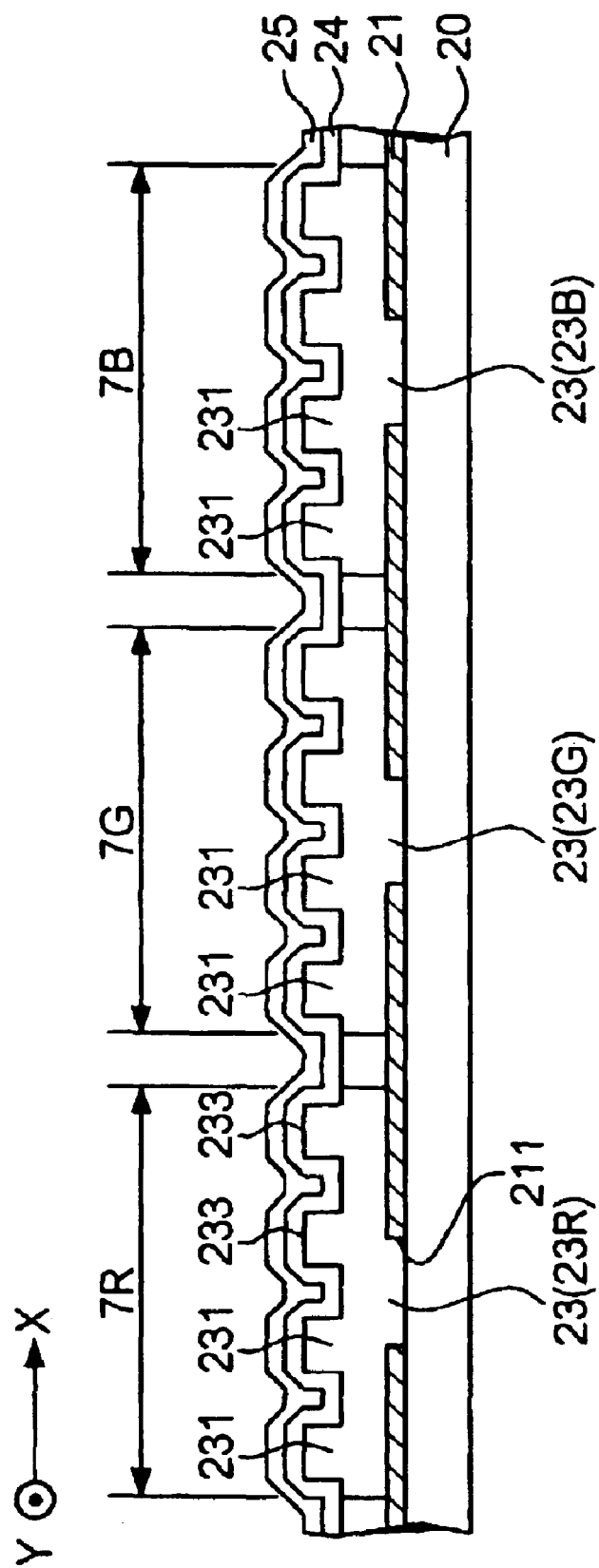
FIG. 3 is a sectional view showing in enlarged form color filters of the liquid crystal display panel.
Figure 4:
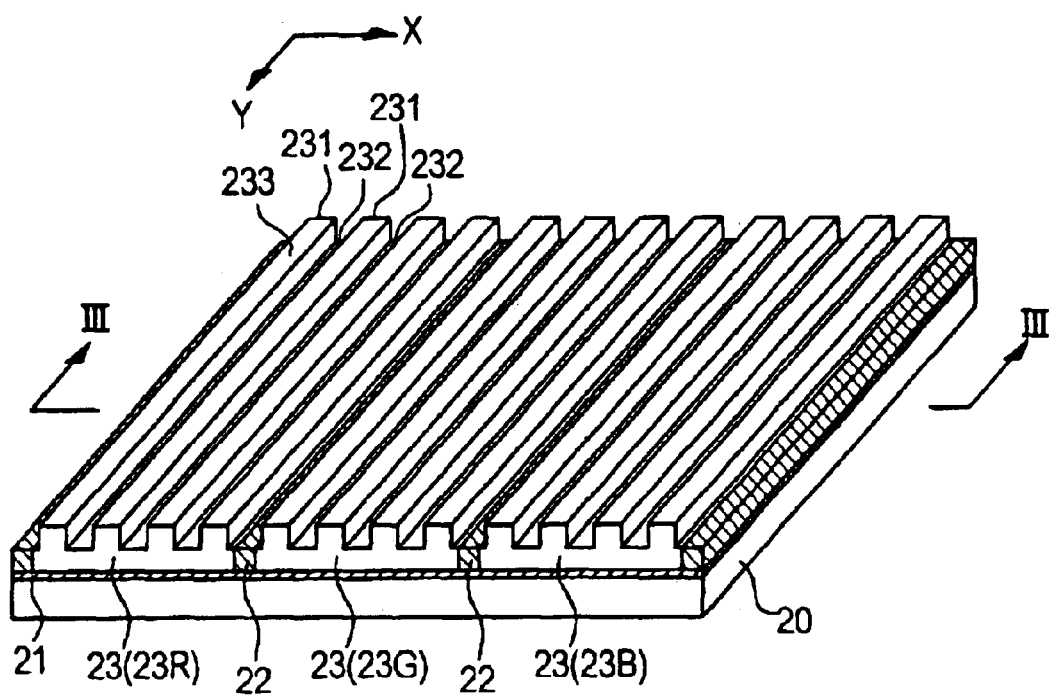
FIG. 4 is a perspective view of the structure of the color filters of the liquid crystal display panel.

FIG. 3 is a sectional view showing in enlarged form each element on the second substrate 20, and FIG. 4 is a perspective view of the structures of the color filters 23. The sectional view from line III—III in FIG. 4 corresponds to FIG. 3. In these figures, an element that is associated with one pixel formed by three sub-pixels 7 corresponding to the three colors, red, green, and blue, is shown.

As shown in FIG. 3, protrusions 231 (hereinafter referred to as "alignment control protrusions") are formed at the surfaces of the color filters 23 of the respective colors. As shown in FIG. 4, the alignment control protrusions 231 have profiles in which top portions 233 appear as protruding portions extending in the direction Y when viewed from other portions of the surfaces of the color filters 23. In other words, it can be said that grooves 232 that are lower than the top portions 233 of the alignment control protrusions 231 extend in one direction at portions of the surfaces of the color filters 23 other than where the alignment control protrusions 231 are formed. The heights of the top portions 233 of the respective alignment control protrusions 231 when viewed from the bottoms of the respective grooves 232 are each on the order of 1 μm, and the distances between the alignment control protrusions 231 (that is, the widths of the grooves 232) are each on the order of 20 μm.

As shown in FIG. 3, the data lines 24 and the alignment films 25 are formed as thin films on the surfaces of the color filters 23 where the alignment control protrusions 231 are formed. Therefore, protrusions that correspond with the alignment control protrusions 231 (or depressions that correspond with the grooves 232) are formed at the surface of the alignment film 25. As a result, the long axes of the molecules of the liquid crystals 40 near the alignment film 25 are aligned along the protrusions and depressions extending along the surface of the alignment film 25. In other words, when a voltage is not applied to the liquid crystals 40, the long axes of the liquid crystals 40 are aligned homogeneously along the extending direction of the alignment control protrusions 231, or parallel to the surface of the second substrate 20.

Accordingly, in the embodiment, since the surfaces of the color filters 23 have profiles that allow the state of alignment of the liquid crystals to be defined, it is not necessary to rub the alignment film 25. Therefore, various problems caused by rubbing the alignment film 25, such as the adherence of dust or production of static electricity, can be effectively restricted.

The action of defining the direction of alignment of liquid crystal molecules 41 (hereinafter referred to as the "alignment control action") increases with the increasing area of contact of the liquid crystals 40 with the alignment film 25. Therefore, it is desirable to select the distances between adjacent alignment control protrusions 231 (the widths of the grooves 232) and the sizes of the alignment control protrusions 231 at the surfaces of the color filters 23 as follows.

Figure 5:
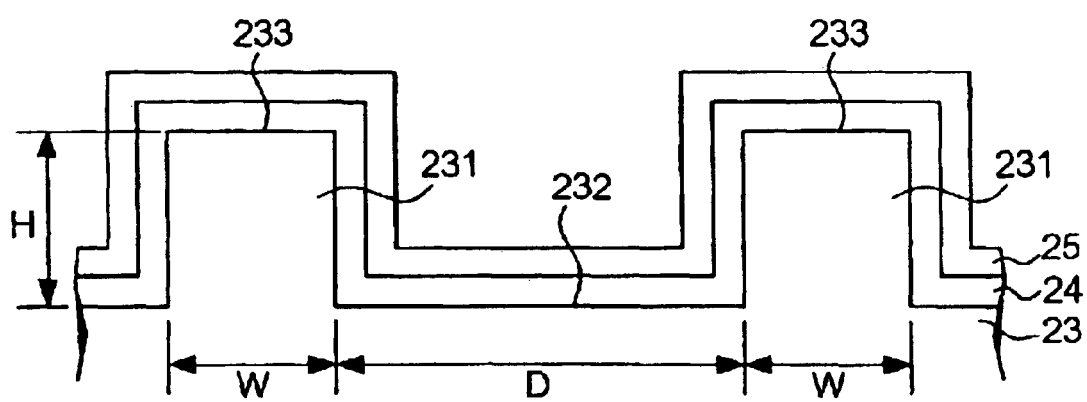
FIG. 5 is a sectional view showing in a further enlarged form one of the color filters of the liquid crystal display panel.

First, it is desirable for a width W of each alignment control protrusion 231 shown in FIG. 5 to be small. More specifically, if the width of each alignment control protrusion 231 is less than about of 10 μm, a proper alignment control action for providing a displayed image with sufficient contrast is realized. It is presently difficult to make the width of each alignment control protrusion 231 smaller than 1 μm due to manufacturing technological reasons. Therefore, it is desirable for the width W of each alignment control protrusion 231 to be from 1 μm to 10 μm inclusive.

Next, it is desirable for a height H of each alignment control protrusion 231 shown in FIG. 5 to be large. However, the height H of each alignment control protrusion 231 cannot be made larger than a cell gap (the thickness of the layer of the liquid crystals 40). In general, the thickness of the cell gap is on the order of from 3 μm to 5 μm inclusive, so that it is desirable for each height H to be less than about 3 μm. However, when the height H of each alignment control protrusion 231 is made too small, stepped portions (heights H) formed by the grooves 232 and the top portions 233 are leveled by the data lines 24 and the alignment film 25, which are formed on the color filters 23, so that an alignment control action may not occur. Therefore, it is desirable for each height H to be larger than the sum total of the thickness of the data line 24 and the thickness of the alignment film 25. In general, the thickness of each data line 24 is on the order of 0.1 μm, and the thickness of the alignment film 25 is on the order of 0.05 μm. Therefore, if each height H is on the order of 1 μm, which is sufficiently larger than the sum total (0.15 μm) of the thickness of the data line 24 and the alignment film 25, a sufficient alignment control action occurs. Accordingly, it is desirable for the height H of each alignment control protrusion 231 to be from 1 μm to 3 μm inclusive.

It is desirable that a distance D (see FIG. 5) between adjacent alignment control protrusions 231 be small. More specifically, if each distance D is less than about 70 μm, a proper alignment control action for providing a display image with sufficient contrast is realized. On the other hand, if each distance D is made too small, the surface of the alignment film 25 is subjected to a leveling operation without the data lines 24 and the alignment film 25 entering the stepped portions formed by the grooves 232 and the top portions 233, so that a desired alignment control action may not occur. To prevent this, it is desirable for each distance D to be greater than twice the sum total of the thickness of the data line 24 and the thickness of the alignment film 25. For example, in the case where the sum total of the thickness of a data line 24 and the thickness of the alignment film 25 is on the order of 0.15 μm, when each distance D is on the order of 3 μm, a sufficient alignment control action occurs. Accordingly, it is desirable for each distance D between adjacent alignment control protrusions 231 to be from 3 μm to 70 μm inclusive.

A-2: Method of Producing Liquid Crystal Display Panel

Next, a method of producing the liquid crystal display panel 1 of the above embodiment will be described with reference to FIGS. 6 and 7. However, since each element on the first substrate 10 can be produced using various known technologies, the method of producing these elements will not be described. Hereunder, the method of producing each element on the second substrate 20 will be primarily described.

A thin metallic film having light reflectivity is formed so as to cover the entire surface of the second substrate 20 facing the first substrate 10 by sputtering. Then, by patterning the thin film by photolithography and etching, as in Step a in FIG. 6, a reflective layer 21 having light-transmissive sections 211 formed in correspondence with respective sub-pixels is formed. In order to form the surface of the reflective layer 21 with a scattering structure, it is desirable to roughen the surface of the second substrate 20 prior to forming the reflective layer 21. Alternatively, it is possible to form a resin layer covering the surface of the second substrate 20 prior to forming the reflective layer 21 and to roughen the surface of the resin layer.

Next, a thin chromium (Cr) film is formed by sputtering so as to cover the second substrate 20 having the reflective layer 21 formed thereon. Thereafter, by patterning the thin film by photolithography and etching, as in Step b in FIG. 6, light-shielding layers 22 that are arranged in the form of a lattice as a result of overlapping the gaps between the respective sub-pixels 7 are formed. Here, although the light-shielding layers 22 are formed of chromium, they may be formed of resin materials that have been colored black by, for example, carbon black. Alternatively, the light-shielding layers 22 may be formed by stacking color filters 23R, 23G, and 23B of three colors, which are formed in a later step, at the gaps between the respective sub-pixels 7.

Next, as described in detail below, the color filters 23R, 23G, and 23B of the corresponding three colors, red, green, and blue, are successively formed onto the surface of the second substrate 20. Here, although the red color filter 23R, the green color filter 23G, and the blue color filter 23B are successively formed in that order, the order in which the color filters 23 of the respective colors are formed is not limited to this.

Figure 6:
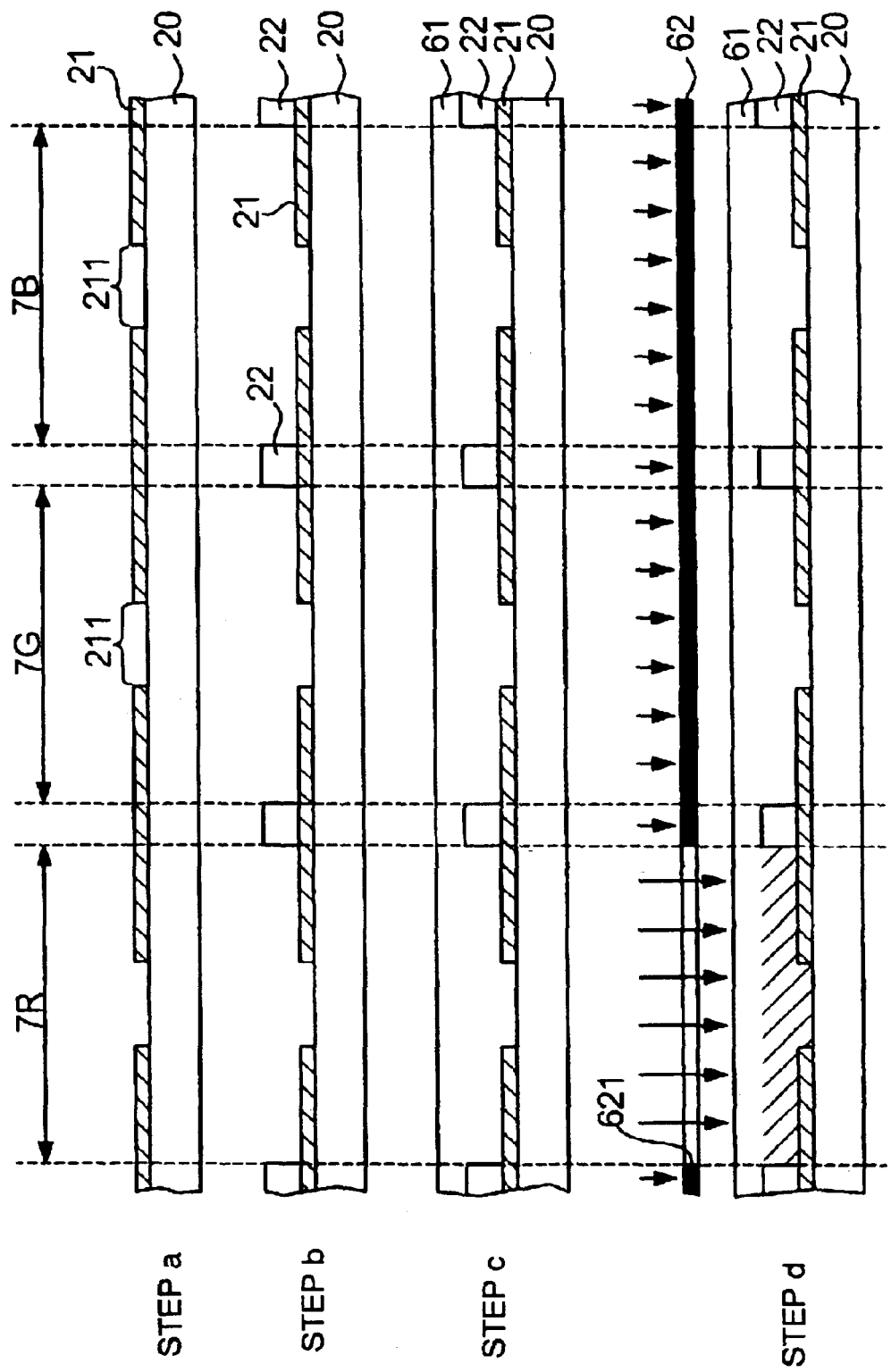
FIG. 6 is a sectional view illustrating a method of producing the liquid crystal display panel.

As in Step c shown in FIG. 6, first, a resin layer 61 is formed so as to cover the entire surface of the second substrate 20. The resin layer 61 is formed of a resin material, such as acrylic resin or epoxy resin, that is colored red by a pigment and to a thickness on the order of 2 $\mu$m. Here, the resin layer 61 is formed of a negative resin material that hardens when it reacts to light as it is exposed. Next, as in Step d shown in FIG. 6, the resin layer 61 is irradiated with ultraviolet light through a mask 62. As shown in FIG. 6, a light-transmissive section 621 transmitting ultraviolet light is formed in the mask 62 so as to overlap the area of the resin layer 61 where the red color filter 23R is to be formed (that is, the area of the resin layer 61 corresponding to a sub-pixel 7R). The other portions of the mask 62 intercept ultraviolet light heading towards the areas of the resin layer 61 where the green and blue color filters 23G and 23B are to be formed and the light-shielding layers 22. The amount of exposure to the area of the resin layer 61 where the red color filter 23R is to be formed is adjusted so that only a portion of the resin layer 61 in the thickness direction (having a thickness on the order of 1 $\mu$m) is hardened by reacting to light, that is, so that not all of the portions of the resin layer 61 in the thickness direction are hardened. In FIG. 6, the portion of the resin layer 61 that is hardened by the exposure step is hatched.

Figure 7:
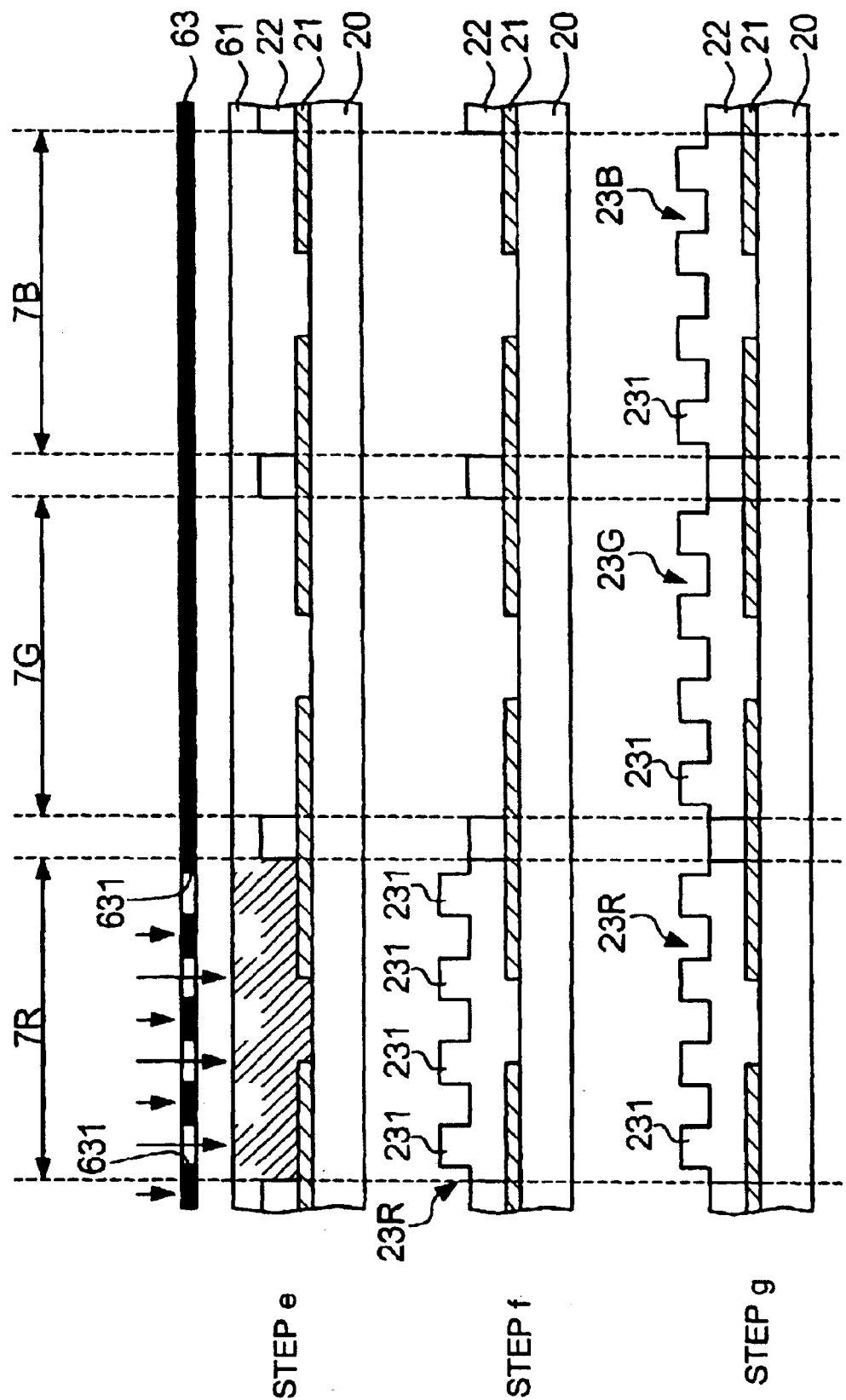
FIG. 7 is a sectional view illustrating the method of producing the liquid crystal display panel.

Next, as in Step e shown in FIG. 7, the resin layer 61 is irradiated with ultraviolet light through a mask 63 that is different from the mask 62. As shown in FIG. 7, light-transmissive sections 631 are formed in the mask 63 so as to overlap the areas where the alignment control protrusions 231 are to be formed in the area where the red color filter 23R is to be formed. In other words, the areas other than where the alignment control protrusions 231 are to be formed in the area where the red color filter 23R is to be formed, the areas where the green and blue color filters 23G and 23B are to be formed, and the areas where the light-shielding layers 22 are formed are not irradiated with ultraviolet light. As shown by hatching in FIG. 7, in the exposure step, the amount of exposure is adjusted so that the portion that hardens by reacting to light reaches the surface of the resin layer 61.

Next, the resin layer 61 is developed, and is removed while leaving the portion thereof that has been hardened by the exposure. As in Step f shown in FIG. 7, by the developing step, the portions of the resin layer 61 other than where the red sub-pixel 7R is formed are removed, and a plurality of linear portions at the surface of the portion of the resin layer 61 corresponding to where the red sub-pixel 7R is formed (the portions corresponding to where the grooves 232 are formed) are removed over a portion of the resin layer 61 in the thickness direction. As a result, the red color filter 23R having the plurality of alignment control protrusions 231 whose top portions extend in one direction is formed.

Thereafter, the green and blue color filters 23G and 23B are successively formed by the same procedure used to form the red color filter 23R as illustrated in Steps c and d in FIG. 6 and Steps e and f in FIG. 7. In other words, first, a resin layer corresponding to each color is formed over the entire surface of the second substrate 20. Second, a portion of the area in the thickness direction where the color filter 23 of the corresponding color is to be formed is hardened. Third, areas where the alignment control protrusions 231 are formed in the area where the color filter 23 is to be formed are hardened. Fourth, the resin layer is developed. By repeating these steps, the three types of color filters, the red, green, and blue color filters 23R, 23G, and 23B are formed as in Step g shown in FIG. 7.

Here, although the color filters 23 are formed of negative resin materials, they may be formed of positive resin materials that soften by reacting to light as they are exposed. In this case, the exposure illustrated in Step d shown in FIG. 6 is carried out using a mask having the light-transmissive sections 621 and the other portions of the mask 62 reversed, and the exposure illustrated in Step e shown in FIG. 7 is carried out using a mask having the light-transmissive sections 631 and the other portions of the mask 63 reversed.

Next, a thin film formed of ITO is formed so as to cover the color filters 23 and the light-shielding layers 22. After forming data lines 24 by patterning the thin film, an alignment film 25 is formed so as to cover these data lines 24 (see FIG. 3). As mentioned above, the alignment film 25 is not rubbed.

The above-described method is the method of producing each element on the second substrate 20. Thereafter, the second substrate 20 that has been subjected to the above-described method and the first substrate 10 having formed thereon the pixel electrodes 11, the scanning lines 12, the TFD elements 13, and the alignment film 14 are bonded together with the sealant 30 with their electrode surfaces opposing each other. By sealing the liquid crystals 40 in the area that is surrounded by both substrates and the sealant 30, and bonding the retardation films 102 and 202 and the polarizers 101 and 102, the liquid crystal display panel 1 shown in FIG. 1 is produced.

In this manner, according to the method of producing the liquid crystal display panel of the embodiment, it is not necessary to rub the alignment film 25 on the second substrate 20, so that it is possible to prevent the occurrence of the various problems caused by rubbing the alignment film 25, such as a reduction in yield, adherence of dust that is produced as the alignment film is rubbed or damage to the TFD elements 13 due to production of static electricity.

In order for the surface profile of the alignment film 25 to define the state of alignment of the liquid crystals 40 without rubbing it, the following method may be carried out. Protrusions are formed on the color filters 23 and the light-shielding layers 22 using, for example, another piece of resin material that is different from those used to form the color filters 23 and the light-shielding layers 22, and the alignment film 25 is formed so as to cover the protrusions. However, in order to form the protrusions, the step of forming the resin layer using a resin material and the step of forming the protrusions by selectively removing portions of the resin layer are required.

In contrast to this, according to the method of producing the liquid crystal display panel of the embodiment, the alignment control protrusions 231 for defining the state of alignment of the liquid crystals 40 are formed at the same time that the color filters 23 are formed. Therefore, compared to the case where the alignment control protrusions 231 are formed independently of the color filters 23, the production process can be simplified, so that production costs can be reduced.

B: Second Embodiment

B-1: Structure of Liquid Crystal Display Panel

Next, a description of a liquid crystal display panel of a second embodiment of the present invention will be given. Apart from the profiles of the color filters, the liquid crystal display panel of the second embodiment has the same structure as the liquid crystal display panel 1 of the first embodiment shown in FIG. 1. Therefore, hereunder, only the profiles of the color filters of the liquid crystal display panel of the second embodiment will be described, and the other structural features will not be described below. In the figures illustrated below, component parts of the liquid crystal display panel of the second embodiment corresponding to those of the liquid crystal display panel of the first embodiment are given the same reference numerals.

Figure 8:
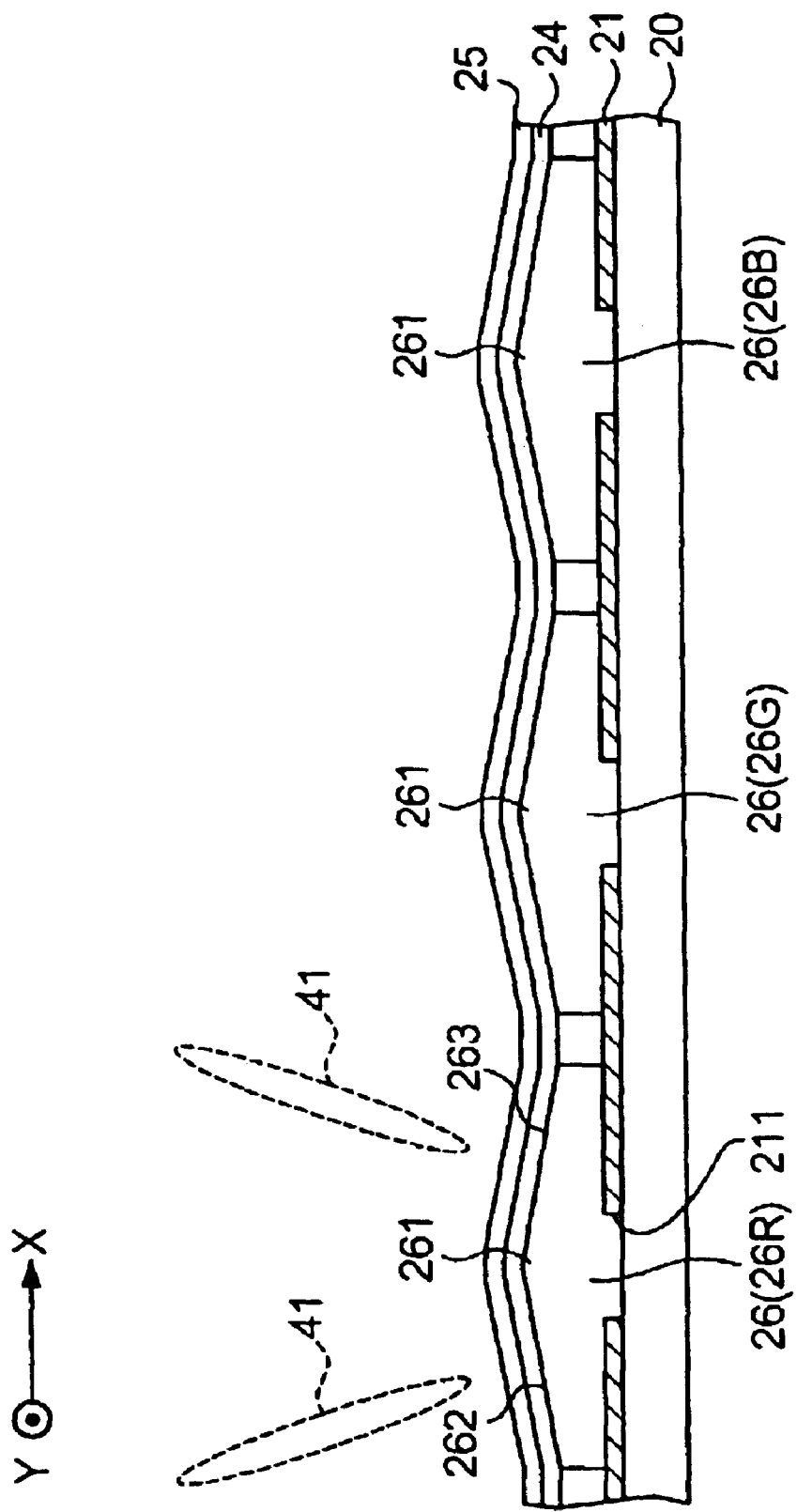
FIG. 8 is an enlarged view of color filters of a liquid crystal display panel of a second embodiment of the present invention.
Figure 9:
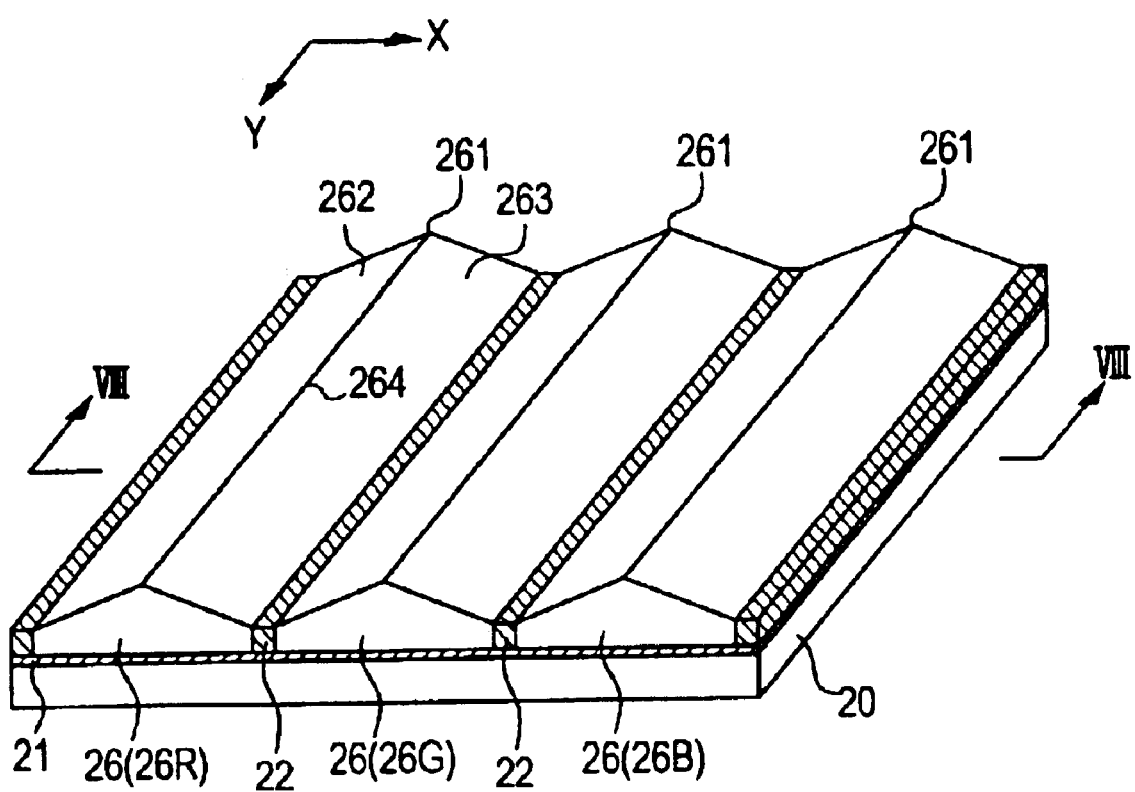
FIG. 9 is a perspective view of the structure of the color filters of the liquid crystal display panel.

FIG. 8 is a sectional view showing in enlarged form each element on a second substrate 20 of the liquid crystal display panel of the second embodiment, and corresponds to FIG. 3 illustrating the first embodiment. FIG. 9 is a perspective view of the structure of the color filters corresponding to one pixel, and corresponds to FIG. 4 illustrating the first embodiment. FIG. 8 is a sectional view from line VIII—VIII in FIG. 9.

As shown in FIGS. 8 and 9, color filters 26 (26R, 26G and 26B) used in the second embodiment each have an alignment control protrusion 261 whose top portion extends in a direction Y. In other words, each alignment control protrusion 261 has two surfaces 262 and 263 that are inclined with respect to the surface of the second substrate 20. An intersection line 264 extending in the direction Y is formed at the surfaces 262 and 263, and each alignment control protrusion 261 is such as to protrude towards the viewer at the intersection line 264. In other words, looking at the cross section of the color filters 26, as shown in FIG. 8, it can be said that each color filter 26 is substantially pentagonal in cross section having one of the apices protruding towards the viewer.

As shown in FIG. 8, data lines 24 and an alignment film 25 are formed as thin films on the surfaces of the color filters 26 having the respective alignment control protrusions 261. Therefore, protrusions that are in correspondence with the alignment control protrusions 261 are formed at the surface of the alignment film 25. As a result, as shown by broken lines in FIG. 8, the long axes of molecules 41 of liquid crystals 40 near the alignment film 25 are disposed in an upstanding state in directions that are perpendicular to the inclined surfaces 262 and 263 of each alignment control protrusion 261, respectively. In other words, when a voltage is not applied to the liquid crystals 40, the liquid crystals 40 are disposed homeotropically, that is, the long axes of the liquid crystals 40 are tilted (vertically) with respect to the surface of the second substrate 20.

In the second embodiment, as in the first embodiment, the color filters 26 have surface profiles that can define the state of alignment of the liquid crystals 40, so that it is not necessary to rub the alignment film 25. Therefore, it is possible to prevent the occurrence of the various problems caused by rubbing the alignment film 25.

B-2: Method of Producing the Color Filters 26

Next, a method of producing the liquid crystal display panel of the second embodiment will be described. However, apart from the steps of producing the color filters 26, the method of producing the liquid crystal display panel of the second embodiment is the same as the method of producing the liquid crystal display panel of the first embodiment, so that only the method of producing the color filters 26 will be described. As a result, the method of producing the other component parts will not be described below.

Figure 10:
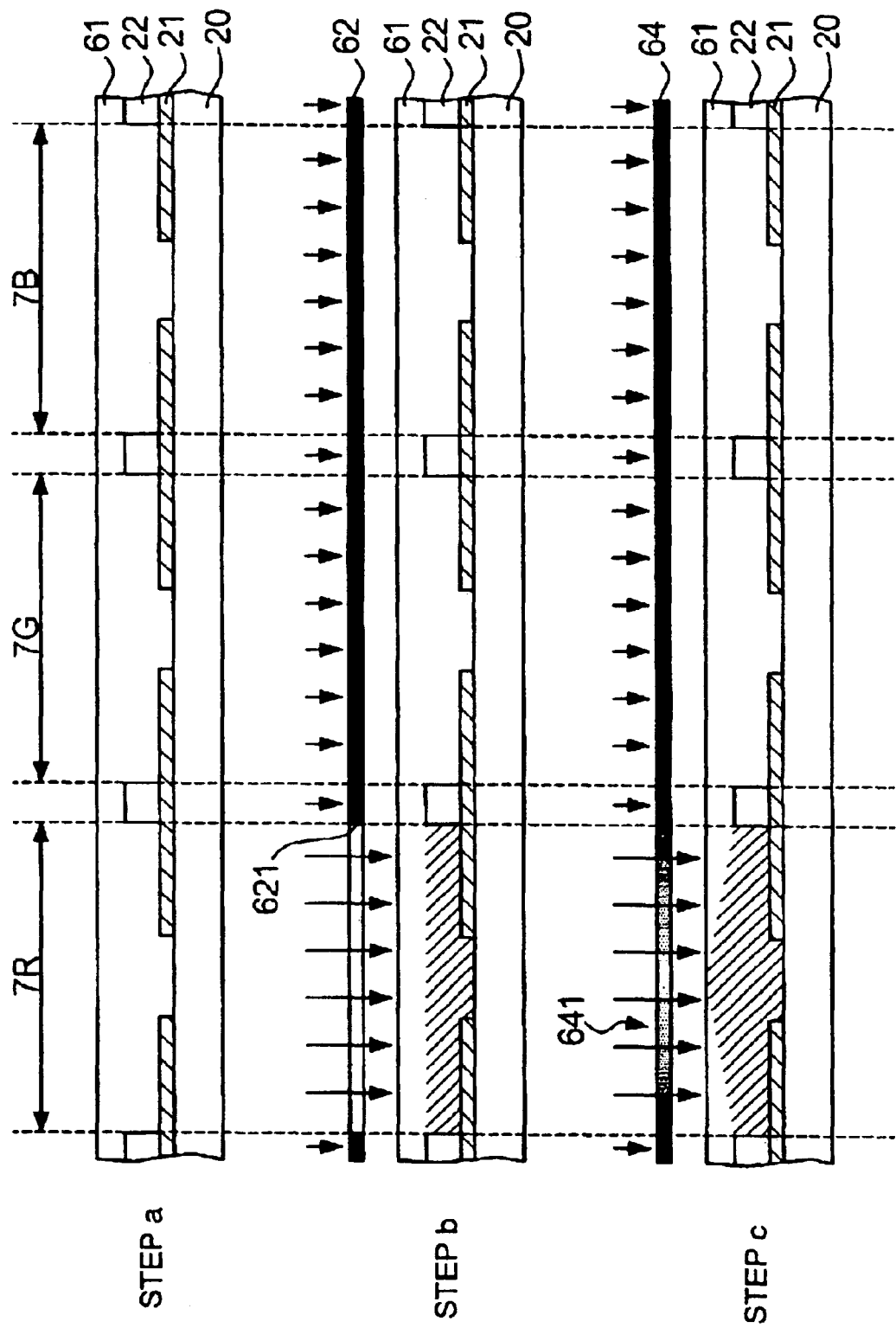
FIG. 10 is a sectional view illustrating a method of producing the liquid crystal display panel.

First, after forming a reflective layer 21 and light-shielding layers 22 onto the second substrate 20 by Steps a and b shown in FIG. 6, a resin layer 61 that has been colored red is formed so as to cover the entire surface of the second substrate 20 as in Step a shown in FIG. 10. Next, as in Step b shown in FIG. 10, the resin layer 61 is irradiated with ultraviolet light through a mask 62. As in the first embodiment, a light-transmissive section 621 is formed in a portion of the mask 62 so as to overlap an area of the resin layer 61 where the red color filter 26R is to be formed. Ultraviolet light traveling towards the other portions is intercepted. The amount of exposure to the area of the resin layer 61 where the red color filter 26R is to be formed is adjusted so that only a portion of the resin layer 61 in the thickness direction (having a thickness of the order of 1 $\mu$m) is hardened by reacting to light. In FIG. 10, the portion of the resin layer 61 that is hardened by the exposure step is hatched.

Next, as in Step c shown in FIG. 10, the resin layer 61 is irradiated with ultraviolet light through a mask 64 that is different from the mask 62. As shown in FIG. 10, a light-transmissive section 641 transmitting ultraviolet light is provided in the area of the resin layer 61 where the red color filter 26R is formed. However, the optical density of the light-transmissive section 641 is a minimum at a location thereof overlapping the top portion of the alignment control protrusion 261 in the area where the red color filter 26R is formed, with the optical density becoming progressively smaller with increasing distance from this location towards the edges of the color filter 26. Therefore, the exposure amount of ultraviolet light to the area of the resin layer 61 where the red color filter 26R is to be formed becomes a maximum at a location corresponding to the top portion of the alignment control protrusion 261, and becomes progressively smaller with increasing distance from this location. Due to the exposure light, as shown by hatching in Step c shown in FIG. 10, the triangular portion of the resin layer 61 corresponding to the alignment control protrusion 261 is hardened.

Next, the resin layer 61 is developed, and is removed while leaving the portion thereof that has been hardened by the exposure. As shown in Step d shown in FIG. 11, by the developing step, the portions of the resin layer 61 other than where a red sub-pixel 7R is formed are removed, and portions of the red sub-pixel element 7R are removed with progressively varying depths in accordance with the locations of the surface of the resin layer 61. As a result, the red color filter 26R having a substantially triangular cross-section alignment control protrusion 261 is produced.

Figure 11:
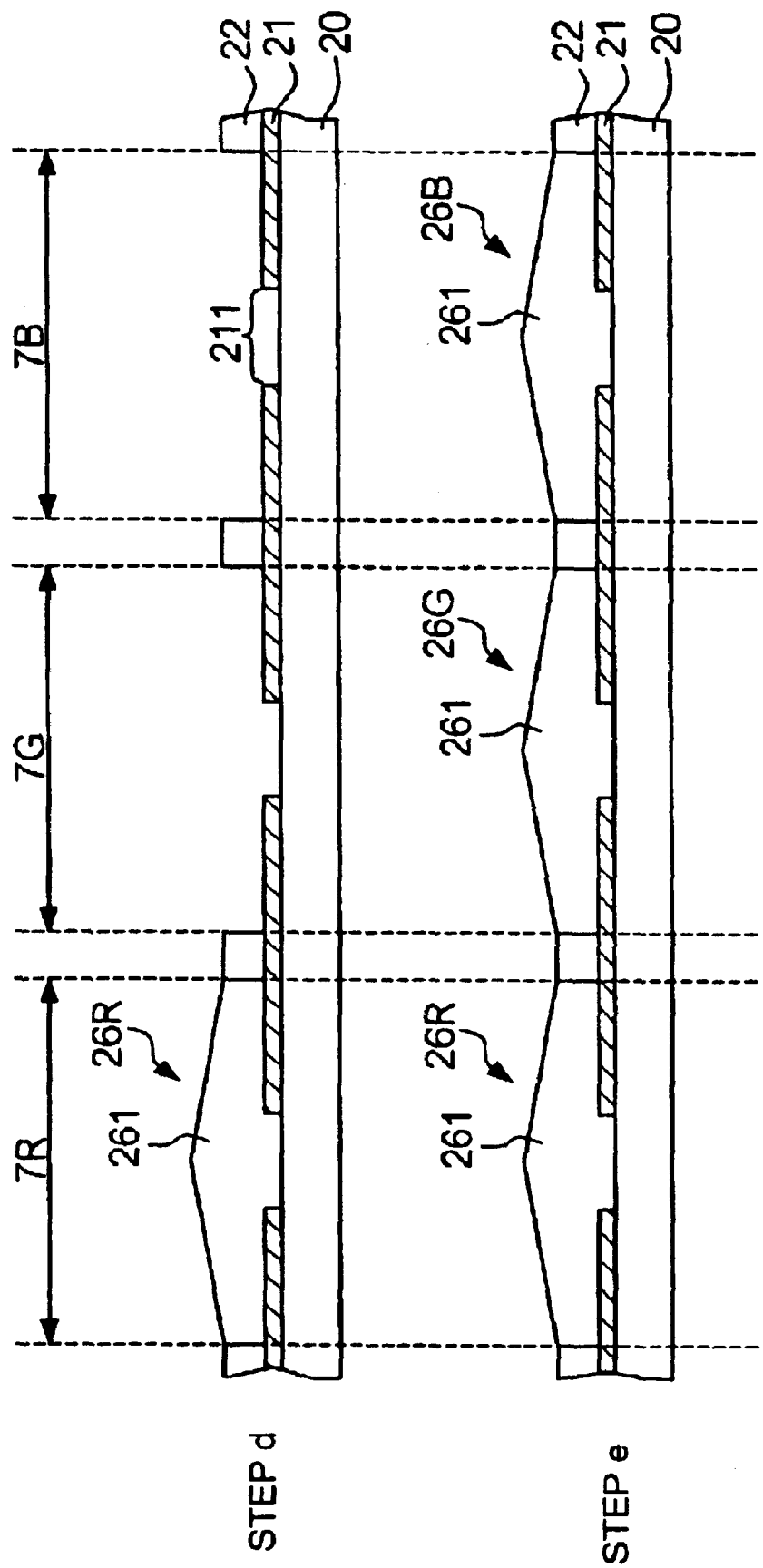
FIG. 11 is a sectional view illustrating the method of producing the liquid crystal display panel.

Thereafter, the green color filter 26G and the blue color filter 26B are successively formed by the same procedure as that used to form the red color filter 26R as illustrated in Steps a and b in FIG. 10 and Step d in FIG. 11. As a result, as in Step e shown in FIG. 11, the color filters 26R, 26G, and 26B having the respective alignment control protrusions 261 for the three colors, red, green, and blue, are produced. Next, by the same procedures as those in the first embodiment, data lines 24 and an alignment film 25 are formed on the surfaces of the color filters 26 and the light-shielding layers 22.

In this way, according to the second embodiment, it is not necessary to rub the alignment film 25 on the second substrate 20, so that it is possible to prevent the occurrence of various problems caused by rubbing the alignment film 25 as in the first embodiment. Therefore, compared to the case where the protrusions for controlling the alignment of the liquid crystals 40 are formed independently of the color filters 26, the production process can be simplified, so that production costs can be reduced.

C: Modification

Although the present invention is described with reference to embodiments, the above-described embodiments are used merely for illustrative purposes, so that the embodiments may be variously modified without departing from the gist of the present invention. Examples of the modifications are given below.

C-1: First Modification

Figure 12:
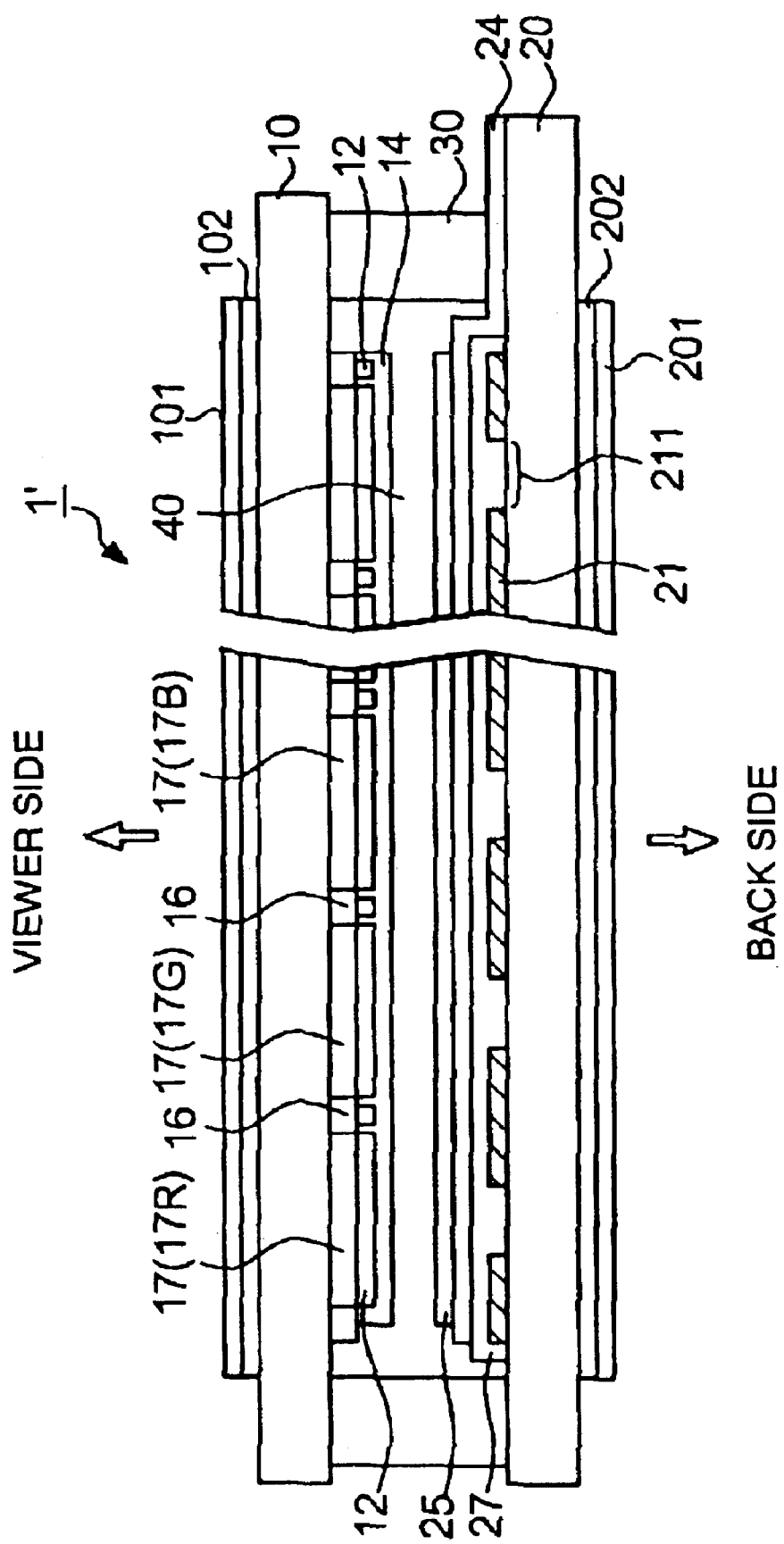
FIG. 12 is a sectional view of the structure of a modification of the liquid crystal display panel of the present invention.

In each of the above-described embodiments, a structure having color filters and light-shielding layers provided on the second substrate 20 disposed at the back side of the liquid crystal display panel is taken as an example. However, the color filters and light-shielding layers may be formed on the first substrate 10 disposed at the viewer side. FIG. 12 is a sectional view of the structure of a first modification of the liquid crystal display panel.

As shown in FIG. 12, in a liquid crystal display panel 1', light-shielding layers 16 and color filters 17 are formed on the surface of a first substrate 10 disposed at the viewer side. The color filters 17 each have an alignment control protrusion for defining the state of alignment of liquid crystals 40 when a voltage is not applied thereto. In other words, the color filters 17 have the same profiles as either the color filters 23 shown in FIGS. 3 and 4 or the color filters 26 shown in FIGS. 8 and 9. Pixel electrodes 11, scanning lines 12, TFD elements 13, and an alignment film 14 are formed at the surfaces of the color filters 17 and the light-shielding layers 16. Depressions and protrusions that correspond with the alignment control protrusions at the surfaces of the color filters 17 are formed at the surface of the alignment film 14. The state of alignment of the liquid crystals 40 is defined by the protrusions and depressions, so that it is not necessary to rub the alignment film 14.

On the other hand, a reflective layer 21 that is provided on the inside surface of the second substrate 20 is covered by an insulating layer 27 formed of, for example, a resin material. Data lines 24 and an alignment layer 25 are provided on the surface of the insulating layer 27. The alignment film 25 is rubbed for defining the state of alignment of the liquid crystals 40.

Accordingly, even if the color filters 17 and light-shielding layers 16 are provided on the first substrate 10 disposed at the viewer side, the same advantages as those of the first and second embodiments are provided. The color filter substrate of the present invention means the substrate where the color filters are provided regardless of whether it is disposed at the viewer side or the back side of the liquid crystal display panel.

C-2: Second Modification

Figure 13:
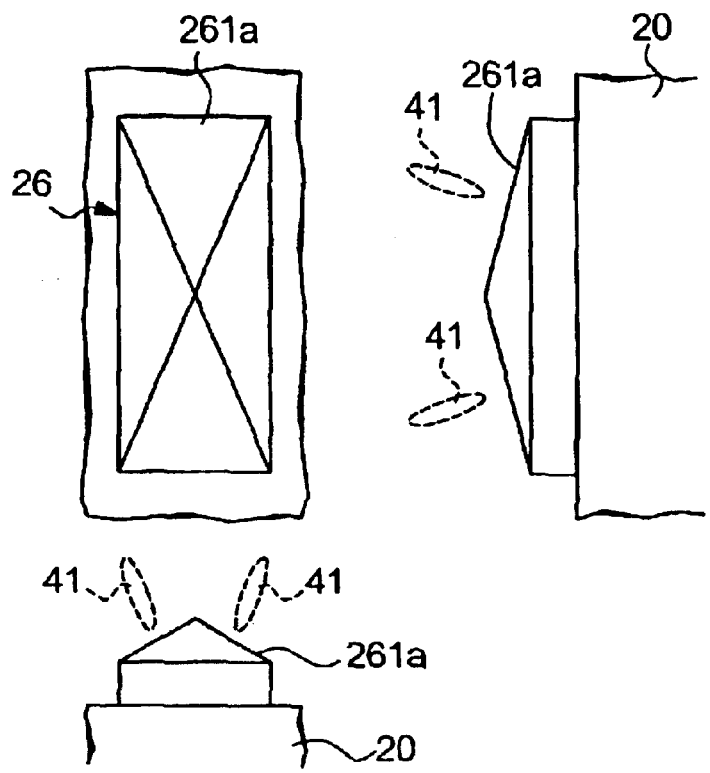
FIG. 13 shows the structure of a modification of the color filter used in the present invention from three sides thereof.
Figure 14:
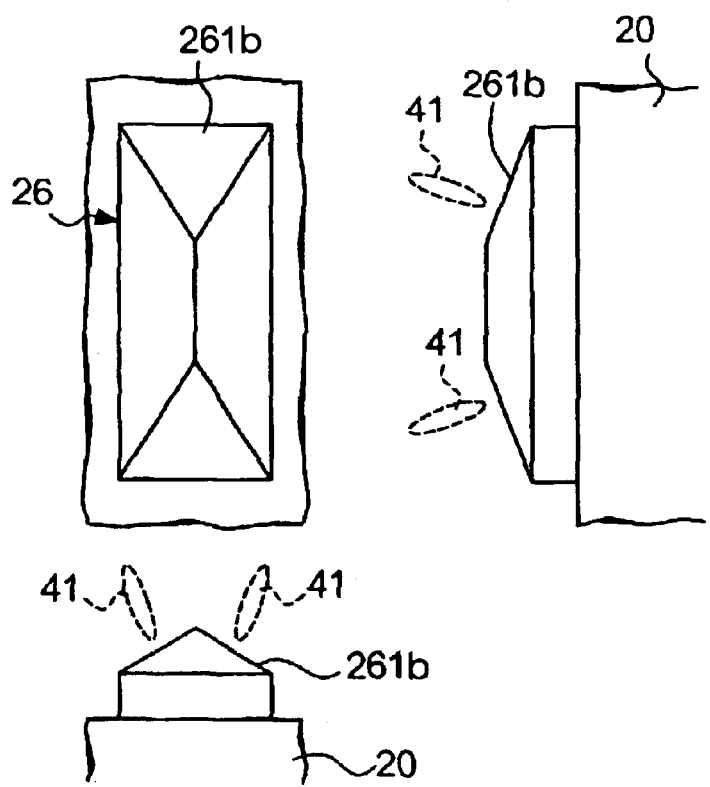
FIG. 14 shows the structure of a modification of the color filter used in the present invention from three sides thereof.
Figure 15:
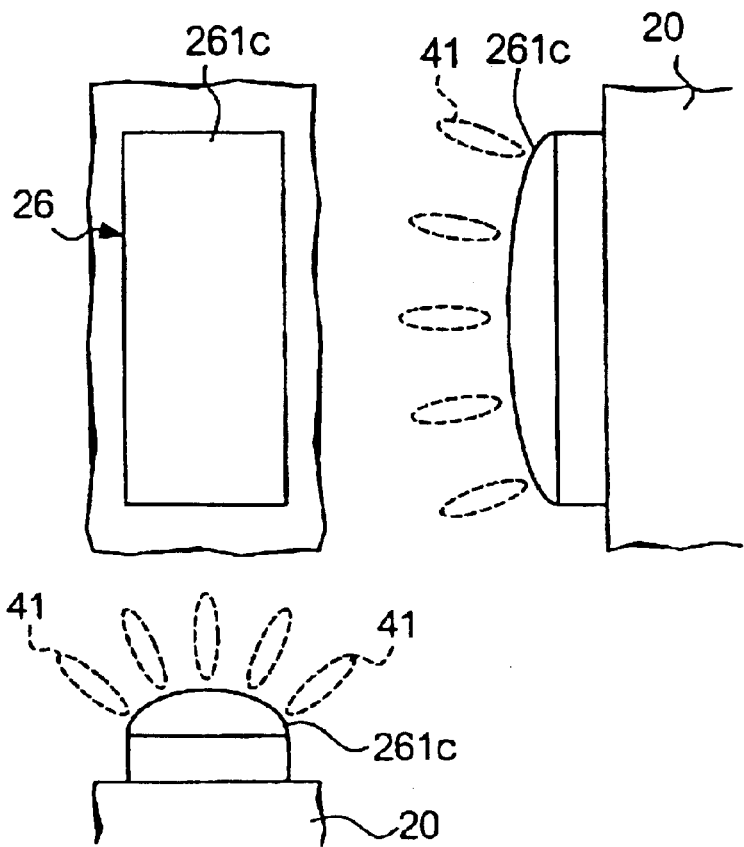
FIG. 15 shows the structure of a modification of the color filter used in the present invention from three sides thereof.

In the first embodiment, the structure in which stripe-shaped alignment control protrusions 231 are provided at the surfaces of the color filters 23 and the liquid crystals are homogeneously aligned is taken as an example. In the second embodiment, the structure in which triangular cross section alignment control protrusions 261 are provided at the surfaces of the color filters 26 and the liquid crystals are aligned vertically is taken as an example. However, the surface profiles of the color filters (that is, the profiles of the alignment control protrusions) and the state of alignment of the liquid crystals are not limited thereto. In other words, the state of alignment of the liquid crystals may be different from those mentioned above, and it is desirable for the surface profiles of the color filters to be selected in accordance with the desired state of alignment. For example, in order to align the liquid crystals 40 vertically as in the second embodiment, the color filters 26 may have the profiles shown in FIGS. 13 to 15. In FIGS. 13 to 15, only the color filter 26 corresponding to one sub-pixel 7 is shown. The color filter 26 shown in FIG. 13 has an alignment control protrusion 261a having a substantially quadrangular pyramidal profile defined by four planes that are inclined with respect to the plate face of the second substrate 20. The color filter 26 shown in FIG. 14 is formed by four planes that are inclined with respect to the plate face of the second substrate 20, and has an alignment control protrusion 261b where two of the planes intersect at a straight line. As shown by broken lines in FIGS. 13 and 14, it is possible to align liquid crystal molecules 41 substantially perpendicular to each of the four planes forming the alignment control protrusion 261a of the color filter 26 shown in FIG. 13 or the alignment control protrusion 261b of the color filter 26 shown in FIG. 14. On the other hand, as shown in FIG. 15, an alignment control protrusion 261c having a curved portion that protrudes in a direction opposite to the second substrate 20 may be used.

Figure 16:
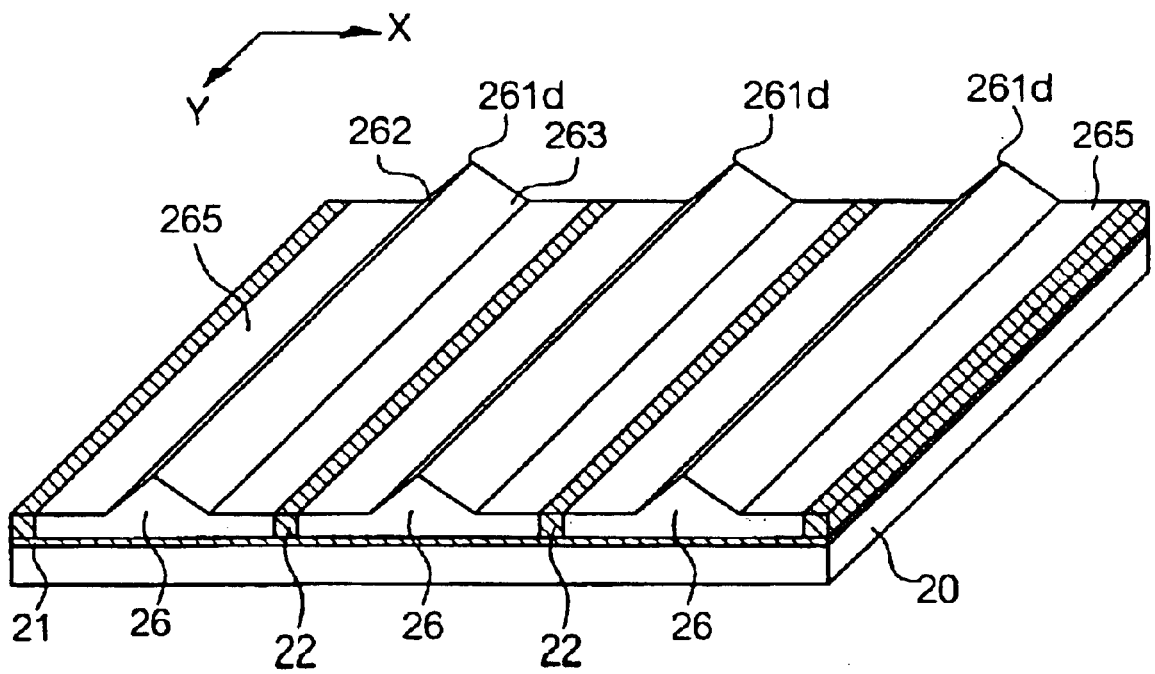
FIG. 16 is a perspective view of the structure of a modification of the color filter used in the present invention.

As shown in FIG. 16, a structure having an alignment control protrusion 261d provided on a portion of each color filter 26 in the widthwise direction may be used. Each color filter 26 shown in FIG. 16 has a planar portion 265 extending parallel to the plate face of the second substrate 20 in addition to an alignment control protrusion 261 similar to that used in the second embodiment having inclined surfaces 262 and 263. In this structure, the liquid crystal molecules 41 are aligned in a direction perpendicular to the inclined surfaces 262 and 263 of each alignment control protrusion 261d.

Figure 17:
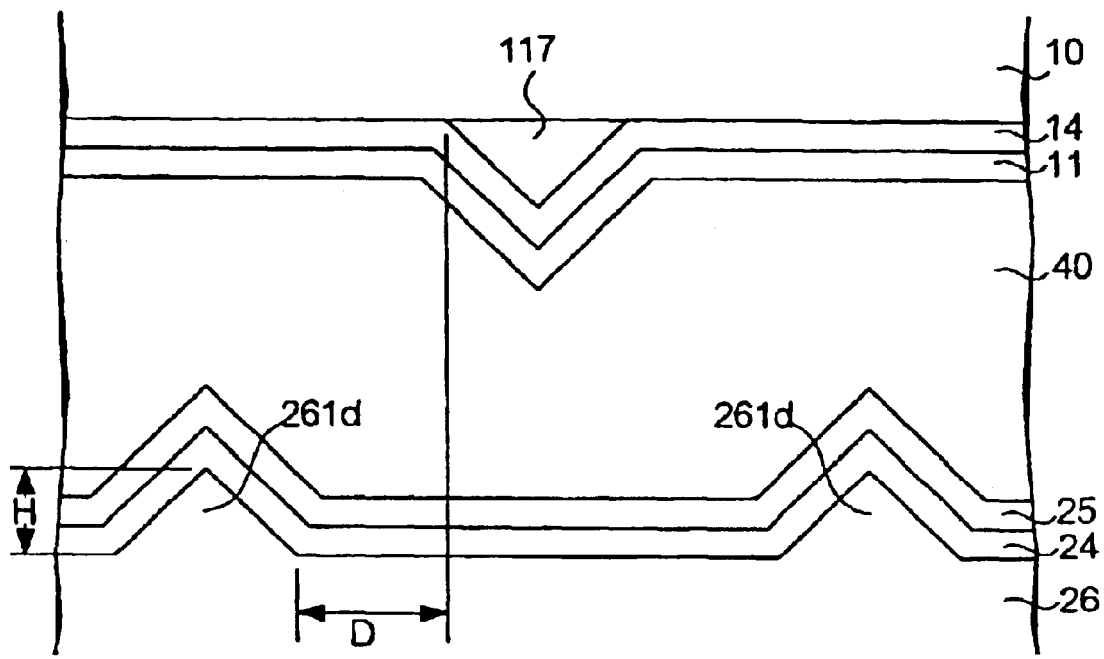
FIG. 17 is a sectional view of the structure of a modification of the liquid crystal display panel of the present invention.

Although, in each of the embodiments and modifications, the structure in which the alignment film 14 on the first substrate 10 is rubbed is used, as shown in FIG. 17, an alignment control protrusion 117 similar to the alignment control protrusion 261d (261, or 261a to 261c) of each color filter 26 may also be provided on the first substrate 10. More specifically, the alignment control protrusion 117 is formed of a resin material, such as acrylic resin or epoxy resin, by the same production process as that used in the first embodiment or the second embodiment. According to this structure, the direction of alignment of the liquid crystal molecules 41 near the first substrate 10 is determined by the alignment control protrusion 117, so that it is not necessary to rub the alignment film 14.

In the structure having the alignment control protrusion 117 provided on the first substrate 10, as shown in FIG. 17, the top portion of the alignment control protrusion 117 and the top portion of an alignment control protrusion 261d on the second substrate 20 may be such as not to overlap each other as viewed from a direction perpendicular to the plate face. More specifically, the alignment control protrusion 117 on the first substrate 10 is made to oppose a planar portion 265 of a color filter 26 on the one hand, and the alignment control protrusion 261d on the second substrate 20 is made to oppose the area of the first substrate 10 where the alignment control protrusion 117 is not provided so that the alignment control protrusion 117 is offset from the alignment control protrusion 261d.

Figure 18:
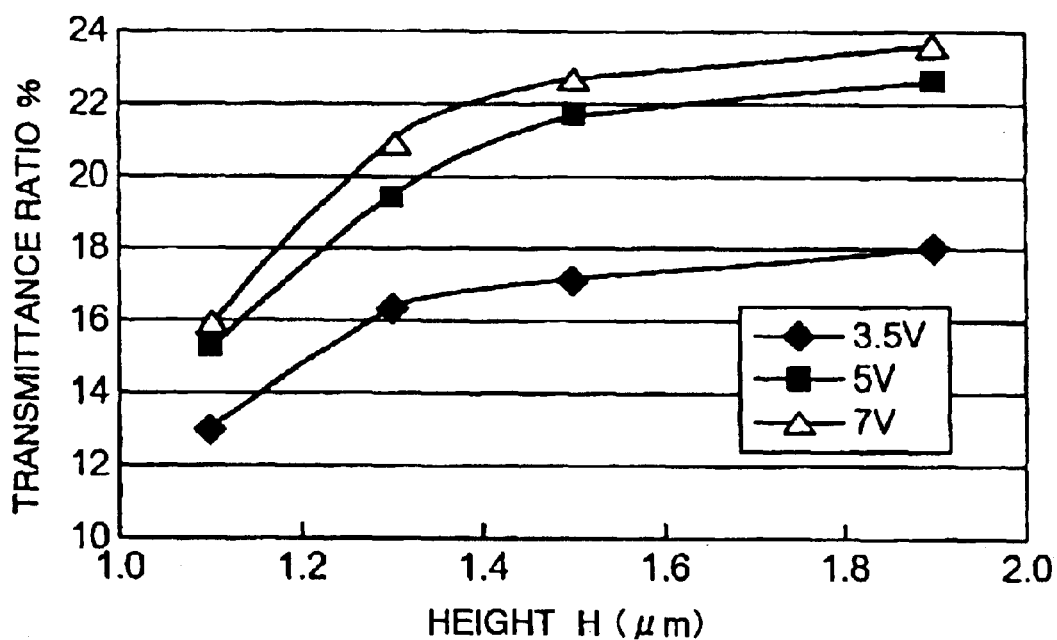
FIG. 18 is a graph showing the relationship between the height of an alignment control protrusion and the transmittance ratio in the modification.

As in the second embodiment and as shown in FIGS. 13 to 16, in the structure comprising alignment control protrusions 261 (including alignment control protrusions 261a, 261b, and 261c) that have inclined surfaces with respect to the second substrate 20, it is desirable to select the height of each alignment control protrusion 261 as follows. Here, FIG. 18 is a graph showing the relationship between a height H of each alignment control protrusion 261 shown in FIG. 17 and the transmittance ratio of the liquid crystal display panel. FIG. 18 shows the transmittance ratio characteristics when voltages having three different values are applied to the liquid crystals 40. As is clear from FIG. 18, the transmittance ratio of the liquid crystal display panel increases as the height H of each alignment control protrusion 261 increases. Therefore, in the structure comprising alignment control protrusions 261 having inclined surfaces with respect to the second substrate 20, it is desirable for the height H of each alignment control protrusion 261 to be large. However, it is necessary to make the height H smaller than a cell gap.

Figure 19:
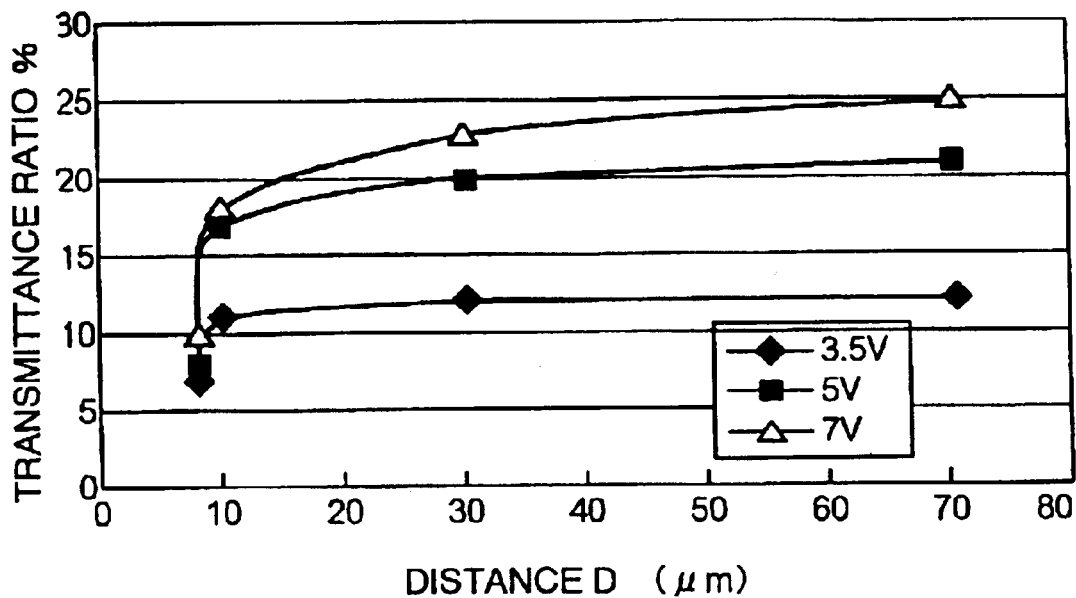
FIG. 19 is a graph showing the relationship between the distance of the alignment control protrusion and the transmittance ratio in the modification.

When the structure shown in FIG. 17 is used, it is desirable to select a distance D between an alignment control protrusion 117 on the first substrate 10 and an alignment control protrusion 261 on the second substrate 20 as follows. FIG. 19 is a graph showing the relationship between the distance D and the transmittance ratio of the liquid crystal display panel. Like FIG. 18, FIG. 19 shows the characteristics when voltages having three different values are applied to the liquid crystals 40. As shown in FIG. 19, when the distance D is approximately equal to or less than 30 $\mu$m, the transmittance ratio increases as the distance D increases. On the other hand, when the distance D exceeds a value of approximately 30 $\mu$m, the transmittance ratio becomes substantially constant regardless of the distance D. Therefore, in order to maintain both the transmittance ratio and the liquid crystal alignment action at a high level, it is desirable for the distance D to be on the order of from 20 $\mu$m to 40 $\mu$m, and, more desirably, on the order of 30 $\mu$m.

C-3: Third Modification

On the other hand, it is desirable to properly select the direction in which the alignment film 14 on the first substrate 10 is rubbed so that the liquid crystals 40 are aligned in the desired direction due to its relationship with the extending direction of each alignment control protrusion 231 (or 261). For example, the alignment film 14 may be rubbed in a direction that is substantially parallel to the extending direction of each alignment control protrusion 231 or 261, or at a certain angle from the direction of extension of each alignment control protrusion 231 or 261. As in the second embodiment, when the liquid crystals 40 (liquid crystal molecules 41) are aligned vertically, it is not necessary to rub the alignment film 14.

C-4: Fourth Modification

Although, in each embodiment and each modification, a transflective liquid crystal display panel which performs a display operation both by transmission and reflection using a reflective layer 21 having light-transmissive sections 211 is taken as an example, the present invention may be applied to a reflective liquid crystal display panel which performs a displaying operation only by reflection using a reflective layer not having light-transmissive sections 211 or to a transmissive liquid crystal display panel which does not have a reflective layer 21 and which performs a displaying operation only by transmission. In addition, although, in each embodiment and each modification, the case where a stripe arrangement in which color filters of the same color form a row is taken as an example, other arrangements, such as a mosaic arrangement or a delta arrangement, may be used for the arrangement of the color filters. The present invention is also applicable to a liquid crystal display panel using a three-terminal switching element that is typified by a TFT (thin film transistor) element, and to a passive matrix liquid crystal display panel not including a switching element. In this way, the present invention is applicable to any substrate or any liquid crystal display panel as long as they are a color filter substrate having color filters formed thereon and a liquid crystal display panel using the color filter substrate, respectively, regardless of whether other structural elements are used.

Figure 20:
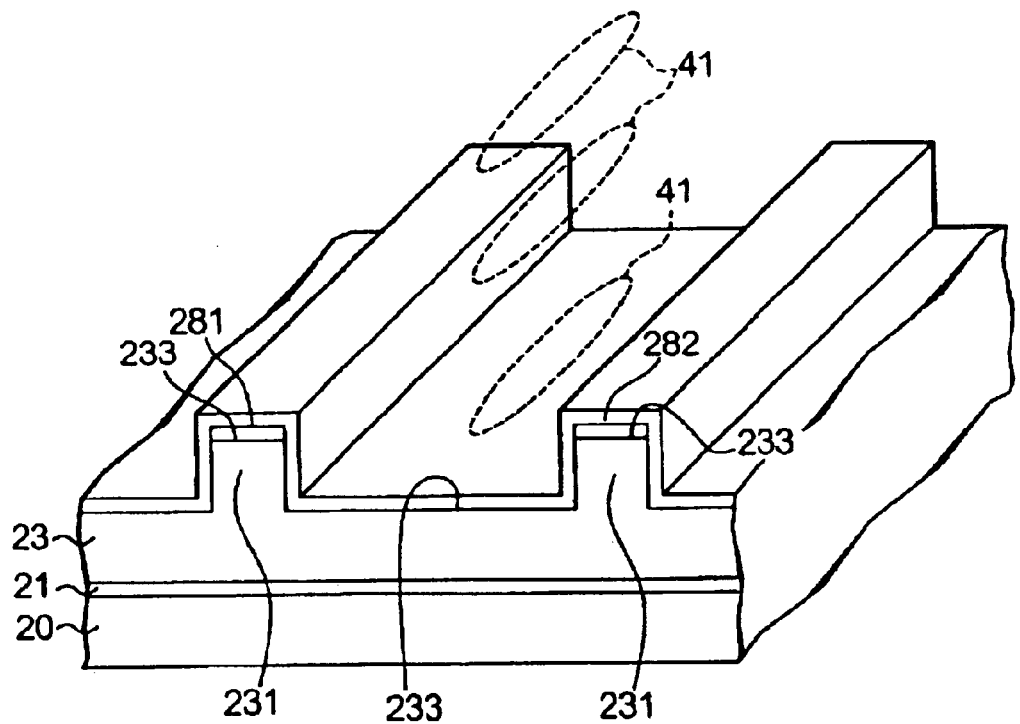
FIG. 20 is a perspective view of the structure of a modification of the liquid crystal display panel of the present invention.

The present invention is also applicable to an IPS (in plane switching) liquid crystal display panel. FIG. 20 is a perspective view showing part of the structure of this type of liquid crystal display panel when the present invention is applied thereto. As shown in FIG. 20, a color filter 23 has a surface profile for homogeneously aligning liquid crystal molecules 41. More specifically, a plurality of alignment control protrusions 231 extending in one direction are provided at the surface of the color filter 23. As shown by hatching in FIG. 20, a pixel electrode 281 and a common electrode 282 are provided on the surface of the color filter 23. The pixel electrode 281 and the common electrode 282 are substantially linear electrodes extending in a direction that is perpendicular to the direction of extension of the alignment control protrusions 231. The surface of the color filter 23 having these electrodes formed thereon is covered by an alignment film 25. On the other hand, although an alignment film is provided on the surface of a first substrate (not shown) opposing a second substrate 20, an electrode is not provided on the first substrate. In this structure, when a voltage is not applied between the pixel electrode 281 and the common electrode 282, as shown by broken lines in FIG. 20, the long axes of the liquid crystal molecules 41 align in a direction that is substantially perpendicular to the extending direction of the alignment control protrusions 231. On the other hand, when a transverse (horizontal) electrical field is produced between the pixel electrode 281 and the common electrode 282 as a result of application of a voltage therebetween, the liquid crystal molecules 41 rotate along the direction of the electrical field in a plane that is parallel to the plate face of the second substrate 20. Even in this structure, the same advantages as those that are provided by each of the above-described embodiments are provided.

D: Electronic Apparatus

Next, an electronic apparatus using the liquid crystal display panel of the present invention will be described.

D-1: Mobile Computer

Figure 21:
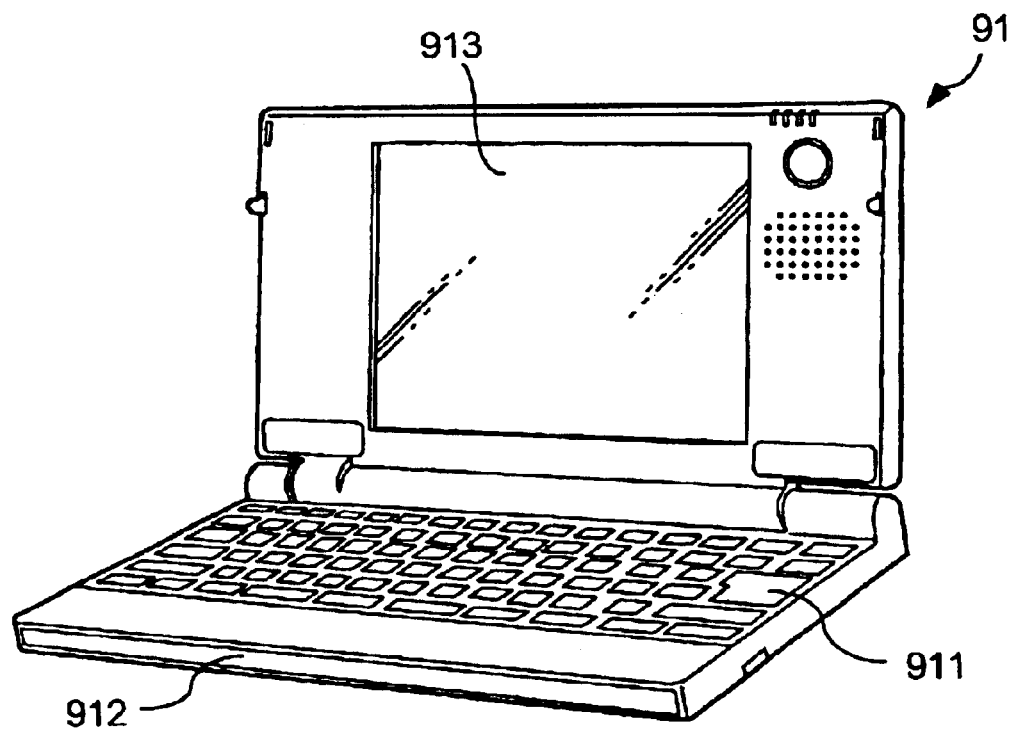
FIG. 21 is a perspective view of the structure of a personal computer that is an example of an electronic apparatus to which the liquid crystal display panel of the present invention is applied.

First, an example in which the liquid crystal display panel of the present invention is applied to a display section of a portable personal computer (what is called a notebook personal computer) will be described. FIG. 21 is a perspective view of the structure of the personal computer. As shown in FIG. 21, a personal computer 91 comprises a body 912 having a keyboard 911 and a display section 913 to which the liquid crystal display panel of the present invention is applied.

D-2: Cellular Phone

Figure 22:
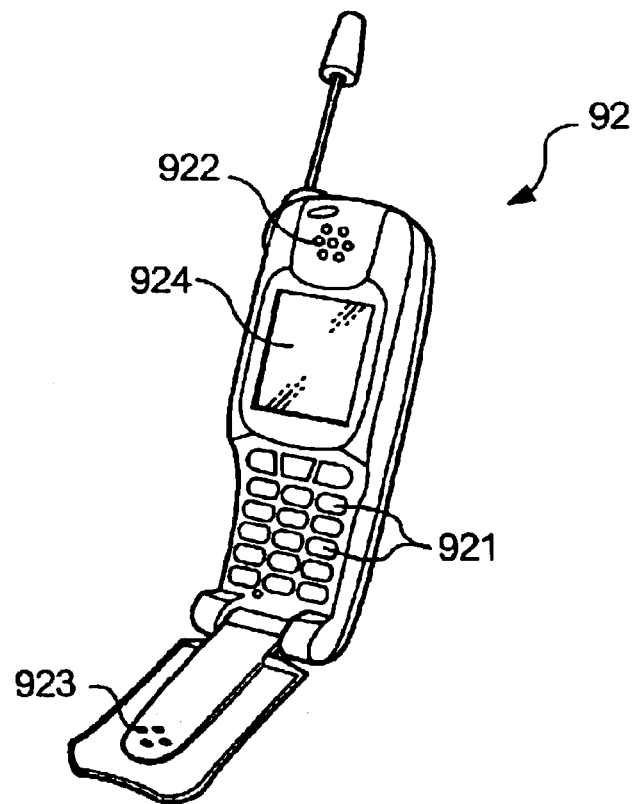
FIG. 22 is a perspective view of the structure of a cellular phone that is an example of an electronic apparatus to which the liquid crystal display panel of the present invention is applied.

Next, an example in which the liquid crystal display panel of the present invention is applied to a display section of a cellular phone will be described. FIG. 22 is a perspective view of the structure of the cellular phone. As shown in FIG. 22, a cellular phone 92 comprises, in addition to a plurality of operating buttons 921, an earpiece 922, a mouthpiece 923, and a display section 924 to which the liquid crystal display panel of the present invention is applied.

Examples of electronic apparatus to which the liquid crystal display panel of the present invention is applicable include, in addition to the personal computer shown in FIG. 21 and the cellular phone shown in FIG. 22, a liquid crystal television, a viewfinder/monitor-direct-viewing-type video tape recorder, a car navigation system, a pager, an electronic notebook, a calculator, a word processor, a work station, a television phone, a POS terminal, and a digital still camera.

Advantages

As described above, according to the present invention, it is possible to eliminate the occurrence of problems caused by rubbing an alignment film.

The entire disclosure of Japanese Patent Application Nos. 2002-006541 filed Jan. 15, 2002 and 2002-343962 filed Nov. 27, 2002 are incorporated by reference herein.

What is claimed is:

1. A color filter substrate comprising:

one of a pair of substrates for sandwiching liquid crystals; and color filters disposed on a surface of the one substrate that faces the liquid crystals, the color filters transmitting light of a particular wavelength and having surface profiles defining a state of alignment of the liquid crystals, wherein the surface profile of each color filter is defined by a plurality of alignment control protrusions having top portions that extend in a common direction.

2. The color filter substrate according to claim 1, wherein the alignment control protrusions have planar flat top portions that extend in the common direction.

3. The color filter substrate according to claim 1, wherein the alignment control protrusions each have a substantially prismatic shape with a linear upper edge that extends in the common direction.

4. The color filter substrate according to claim 1, wherein each alignment control protrusion includes inclined surfaces that join at upper edges to form linear top portions that extend in the common direction.

5. A liquid crystal display panel comprising:

liquid crystals between a pair of opposing substrates; and color filters disposed on a surface of one of the pair of substrates that faces the liquid crystals, the color filters transmitting light of a particular wavelength and having surface profiles defining a state of alignment of the liquid crystals, wherein the surface profile of each color filter is defined by a plurality of alignment control protrusions having top portions that extend in a common direction.

6. The liquid crystal display panel according to claim 5, further comprising:

an electrode disposed on a surface of each color filter for applying a voltage to the liquid crystals; and an alignment film covering the surface of each color filter having the electrode provided thereon;

wherein a distance between adjacent alignment control protrusions is greater than twice a sum total of a thickness of each electrode and a thickness of the alignment film.

7. The liquid crystal display panel according to claim 5, further comprising:

an electrode disposed on a surface of each color filter for applying a voltage to the liquid crystals; and an alignment film covering the surface of each color filter having the electrode provided thereon;

wherein a height of each alignment control protrusion is greater than a sum total of a thickness of each electrode and a thickness of the alignment film.

8. A method of producing a color filter substrate including one of a pair of substrates for sandwiching liquid crystals and color filters which transmit light of a particular wavelength, the method comprising:

a first step of forming a resin layer on a surface of the one substrate that faces the liquid crystals; and a second step of selectively removing portions of the resin layer to form the color filters having surface profiles that define a direction of alignment of the liquid crystals;

wherein the surface profile of each color filter is defined by a plurality of alignment control protrusions having top portions that extend in a common direction.

9. The method of producing a color filter substrate according to claim 8, wherein the second step further comprises removing a plurality of linear areas in a thickness direction from a surface of the resin layer.

10. The method of producing a color filter substrate according to claim 8, wherein the second step further comprises removing a portion of the resin layer in successively varying depth steps at locations along a surface of the resin layer.

11. A color filter substrate comprising:

one of a pair of substrates for sandwiching liquid crystals; and color filters disposed on a surface of the one substrate that faces the liquid crystals, the color filters transmitting light of a particular wavelength and having surface profiles defining a state of alignment of the liquid crystals, wherein the surface profile of each color filter further comprises a curved profile which protrudes away from the one substrate.

12. A liquid crystal display panel comprising:

liquid crystals between a pair of opposing substrates; and color filters disposed on a surface of one of the pair of substrates that faces the liquid crystals, the color filters transmitting light of a particular wavelength and having surface profiles defining a state of alignment of the liquid crystals, wherein the surface profile of each color filter further comprises a curved profile that protrudes away from the one substrate.

13. A method of producing a color filter substrate including one of a pair of substrates for sandwiching liquid crystals and color filters which transmit light of a particular wavelength, the method comprising:

a first step of forming a resin layer on a surface of the one substrate that faces the liquid crystals; and a second step of selectively removing portions of the resin layer to form the color filters having surface profiles that define a direction of alignment of the liquid crystals;

wherein the surface profile of each color filter further comprises a curved profile which protrudes away from the one substrate.

14. The method of producing a color filter substrate according to claim 13, wherein the second step further comprises removing a plurality of linear areas in a thickness direction from a surface of the resin layer.

15. The method of producing a color filter substrate according to claim 13, wherein the second step further comprises removing a portion of the resin layer in successively varying depth steps at locations along a surface of the resin layer.

* * * * *